US009622326B1

(12) United States Patent
Devyver et al.

(10) Patent No.: US 9,622,326 B1
(45) Date of Patent: Apr. 11, 2017

(54) METHOD AND DEVICE FOR DETERMINING EMITTED LIGHT INTENSITY LEVEL

(71) Applicant: AMAZON TECHNOLOGIES, INC., Seattle, WA (US)

(72) Inventors: Michael Serge Devyver, Palo Alto, CA (US); Omar Sze Leung, Palo Alto, CA (US); Serkan Hatipoglu, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/081,394

(22) Filed: Mar. 25, 2016

Related U.S. Application Data

(63) Continuation-in-part of application No. 14/975,329, filed on Dec. 18, 2015.

(51) Int. Cl.
H05B 41/28 (2006.01)
H05B 37/02 (2006.01)
G09G 3/34 (2006.01)

(52) U.S. Cl.
CPC ....... *H05B 37/0227* (2013.01); *G09G 3/3406* (2013.01); *H05B 37/0218* (2013.01); *H05B 37/0281* (2013.01); *G09G 2360/144* (2013.01)

(58) Field of Classification Search
CPC ........... G09G 2360/144; G09G 3/3406; G09G 2310/0281; G09G 2320/0606; G09G 2320/0626; G09G 2320/064; G09G 3/20
USPC ......... 315/247, 291, 307–326, 209 R, 185 S, 315/224, 225, 246
See application file for complete search history.

(56) References Cited

U.S. PATENT DOCUMENTS

| 6,987,787 B1 | 1/2006 | Mick | |
|---|---|---|---|
| 8,643,290 B2 * | 2/2014 | Liu | ...................... G09G 3/3406 315/192 |
| 8,957,598 B2 * | 2/2015 | Kanemitsu | ......... H05B 33/0815 315/209 R |

* cited by examiner

*Primary Examiner* — Tuyet Vo
(74) *Attorney, Agent, or Firm* — Brinks Gilson & Lione

(57) ABSTRACT

Systems and methods are provided for determining a light intensity level of emitted light from an illuminator of a display device and the ambient light surrounding the display device such that, for example, the display device may compensate for performance variations of the illuminator over time.

20 Claims, 17 Drawing Sheets

US 9,622,326 B1

METHOD AND DEVICE FOR DETERMINING EMITTED LIGHT INTENSITY LEVEL

CROSS-REFERENCE TO RELATED APPLICATIONS

This application is a continuation-in-part of U.S. application Ser. No. 14/975,329, filed on Dec. 18, 2015, and bearing the title "Ambient Light Sensing Using Reflected Light," the contents of which is hereby incorporated by reference in its entirety.

BACKGROUND

Many devices include displays for displaying images, text, and other content to a reader. Examples of such displays include cathode ray tubes (CRTs), liquid crystal displays (LCDs), electrophoretic displays (EPDs), light emitting diode displays (LED displays), and the like. Different types of displays have different components, configurations, and principles of operation for converting digital image data into the displayable image and displaying the image. An LCD, for example, must be illuminated from the front or back by an optical system. An EPD and other types of "eInk" and "electronic paper" displays reflect and absorb light incident on the display panel to create the image; thus, the EPD can be lit by ambient light and/or by a front light of the device.

Some devices can automatically adjust display properties and perform other actions to account for ambient light in the device environment. Where an illumination source is used, such as in a backlit LCD or a frontlit EPD, an intensity of the illumination may be varied based at least in part on the ambient light. For example, in sunlight, a backlight on an LCD may be increased while a frontlight on an EPD may be decreased in the same conditions. These devices can include ambient light sensors that detect and measure levels of ambient light incident on the device. Most current ambient light sensors may be inadvertently occluded during use, or may result in a chassis with one or more penetrations. An exemplary implementation that overcame these drawbacks is described in U.S. Pat. No. 8,933,916.

Additionally, various illumination sources may suffer performance variations that may be due to degradation over time and with use or variations in light output caused by variations in temperature. Such performance variations may be perceptible by users, thereby decreasing the functionality or user enjoyment of the device.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

Figure 1:
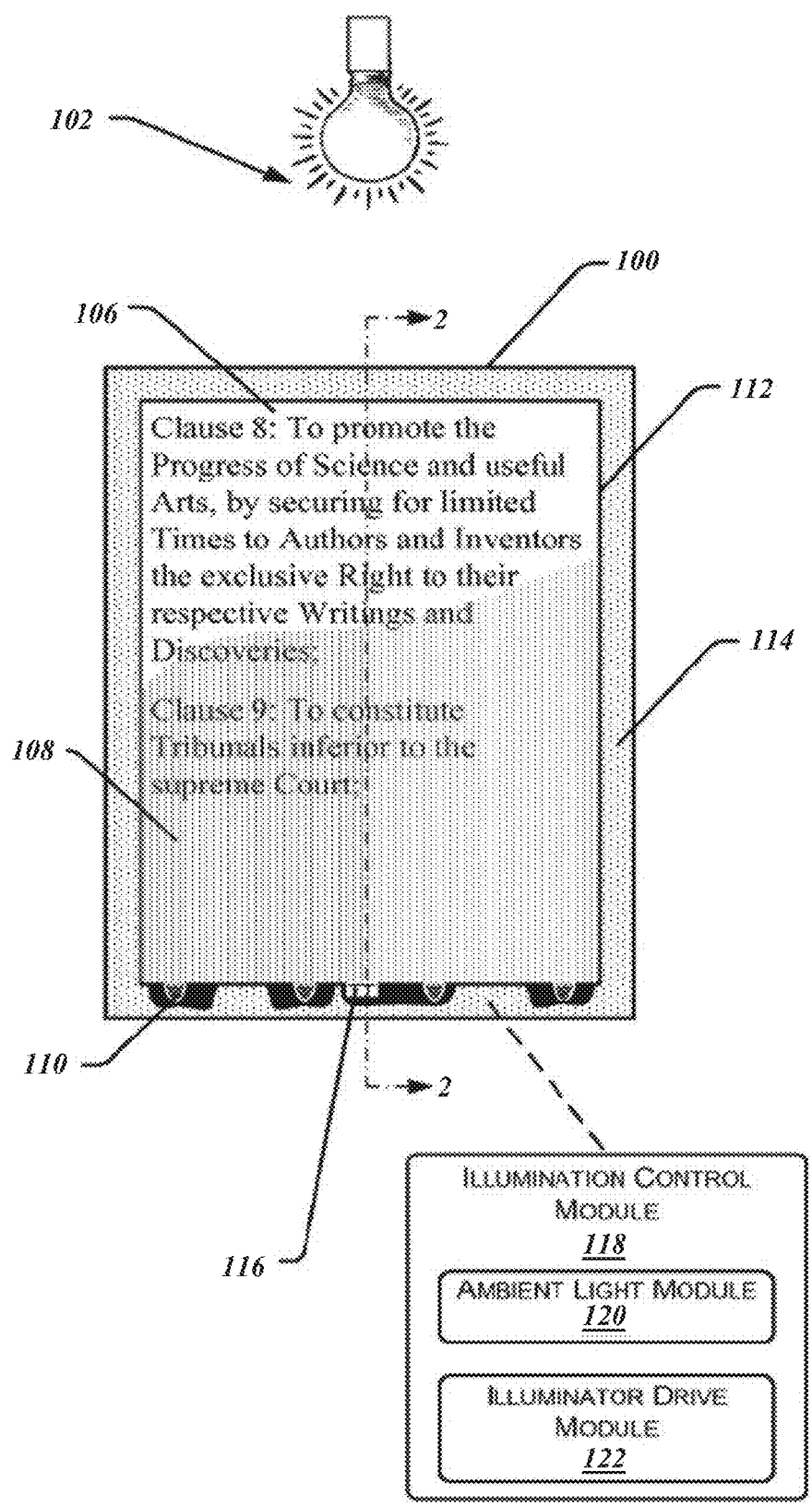
FIG. 1 is a diagrammatic front view of an exemplary device, according to various embodiments of the present systems and methods.

In various embodiments described herein, display devices include displays for presenting content and other information and light sensors, which may be ambient light sensors (ALSs), for detecting and measuring ambient light in the environment of the device. In some embodiments, a light sensor may also detect ambient light together with emitted light from an illuminator of the display device. Processors of a device may perform one or more actions in response to an ambient light level, a level of light attributable to emitted light from the illuminator, and/or a level of light attributable to both ambient light and emitted light from the illuminator, as measured by the light sensor. Some such actions may relate to the display; a processor may change the information displayed or may change display properties, among other actions. For example, the processor may vary a visible brightness level of light that the illuminator emits onto the display, in order to optimize the appearance of the display content. Other actions may include adjusting an intensity of the emitted light to account for performance variations of the illuminator caused by use over time, changes in temperature, and other performance altering causes. Still other actions may be associated with other functionality of the device; the processor may activate a computer program, transition to another operating mode, or enable/disable certain operations depending on the ambient light level and/or emitted light intensity level. For example, if the ambient light level is below a threshold indicating that the device is in the dark, the processor may enable access to a flashlight function of the device.

A traditional light sensor may utilize a hole or aperture in a chassis of the device to acquire ambient light; the ambient light is directly incident on, and directly measured by, the light sensor in this case. These apertures introduce complexity and limitations in the design and manufacture of devices, as well as introducing a weak point in the chassis or a point for intrusion of contaminants such as water or dust. For example, when a chassis or case of the device is white or another light color, the aperture may appear as a black speck or apparent imperfection. Furthermore, the aperture for the light sensor may be inadvertently occluded by a user's hands, protective covers, and so forth. As a result of this occlusion, the light sensor in these traditional designs may not accurately reflect true ambient light conditions.

The described devices and methods improve the operation of such displays and light sensors by positioning the light sensor within the chassis of the device and optically coupling the light sensor directly or indirectly to a reflective display panel so that a portion of the ambient light incident on the display panel is reflected into the light sensor. The intensity of the ambient light incident on the device is thus indirectly measured using the reflected portion of the ambient light. Similarly, in some embodiments, emitted light from the illuminator is also reflected or otherwise directed into the light sensor. In such an approach, the intensity of the ambient light mixed with the emitted light from the illuminator is also measured. The mixture of ambient light and emitted light may be reflected from the surface of the display panel and/or may be otherwise indirectly directed to the light sensor. When a light intensity value of the mixture of ambient and emitted light is measured, as well as a light intensity value of just the ambient light, a difference between the two measured values yields a light intensity value for just the emitted light from the illuminators. In certain embodiments, this emitted light intensity value can be used to monitor and/or compensate for performance variations (e.g., brightness, color, etc.) of the illuminator.

The reflected portion of the light may depend on the content being displayed on the display panel, as described below. A processor of the device is configured to evaluate the content data corresponding to the content before rendering the content data to the display panel, determining a light transmission efficiency (LTE) expected from the content. The LTE value of a display panel displaying the content represents the percentage of the ambient light incident on the display panel that is reflected by the display panel, directed to the light sensor, and detected by the light sensor. That is, the measured value generated by the light sensor and representing the intensity of light received and detected by the light sensor corresponds to the percentage of the ambient light level represented by the LTE value (or, the ambient light level multiplied by the LTE value equals the measured value). For example, if the display panel is illuminated at an ambient light level representing an ambient light intensity of 10,000 lux (e.g., in daylight) and, while the display panel is displaying the content, the light sensor detects a luminance/intensity of 400 lux, the LTE value represents a percentage of 4.0%. The processor may simply calculate the ambient light level from the detected light and the LTE value. For example, when the LTE value is a percentage and the measured value (MV) of detected light is in the same units (i.e., lux) as the ambient light level (ALL), ALL=(MV/LTE)*100. In another embodiment, the LTE value of the display panel displaying the content represents the percentage of the mixture of ambient light incident on the display panel and the emitted light from the illuminator that is reflected by the display panel, directed to the light sensor, and detected by the light sensor.

Some exemplary devices are illustrated and described to demonstrate the optical arrangements and various implementations of the present ambient light measurement processes and the mixed light measurement process. FIG. 1 illustrates a device 100 in an environment which may include ambient light 102 impinging or incident on the device 100 and/or components thereof. The ambient light 102 may be provided by artificial lighting such as a light bulb, by natural lighting such as the sun, or a combination. The ambient light 102 may be provided by a point source such as the sun or other highly localized source, or a diffuse source such as a cloudy sky. The ambient light may comprise photons in infrared wavelengths, visible wavelengths, ultraviolet wavelengths, or a combination thereof. The device 100 may comprise an electronic book ("e-Book") reader device, a computer display, a portable computer, a smartphone, a tablet computer, a game console, a television, an in-vehicle display, and so forth. For clarity of illustration, the figures in this disclosure are not depicted to scale.

The device 100 may comprise one or more displays which may be configured to present visual information to a user. The one or more displays may be emissive or reflective. An emissive display emits light to form an image. Emissive displays include, but are not limited to, backlit LCDs, plasma displays, CRTs, LEDs, image projectors, and so forth. Reflective displays use incident light to form an image. This incident light may be provided by the sun, general illumination in the room, a reading light, a frontlight, and so forth. Reflective displays include electro-optical displays such as EPDs, cholesteric displays, electrowetted displays, and so forth, as well as interferometric and other "eInk" or "e-paper" displays. In some embodiments, an EPD may comprise a reflective electrophoretic material configured such that when electricity is applied, the electrophoretic material moves in front of or behind an absorbent material, and an image may be formed by the absorbed and reflected incident light. The display may be configured to present images in monochrome, color, or both. In some implementations, the display may use emissive, reflective, or combination displays with emissive and reflective elements.

The display may comprise a display panel 106. This display panel 106 may comprise a reflective display such as an EPD, or in some implementations may comprise an emissive display. For ease of discussion, and not by way of limitation, in this disclosure, "front" indicates a side which may be proximate to a user during typical use of the device 100, while the "back" indicates a side opposite the front which is distal to the user during typical use. Each location on a reflective display panel 106 may be configured to reflect all or a portion of the light incident on the display panel 106 at the location. The amount of incident light that is reflected is determined by a brightness of the display panel 106 at the location. The brightness may be in a brightness range extending from zero brightness, at which the location reflects a minimum amount of the incident light and appears black, to maximum brightness, at which the location reflects a maximum amount of the incident light and appears white (e.g., the pixel has an RGB value of {255, 255, 255}). The brightness range may be proportionally associated with a reflectance range of reflectance values representing the percentage of the incident light that is reflected at each brightness. In some embodiments, the display panel 106 may comprise a two dimensional array of display pixels each controllable to produce a discrete brightness. Thus, the display pixels are the locations on the display panel 106 described above.

A light guide panel 108 may be disposed in front of the display panel 106 and optically coupled to the display panel 106. The light guide panel 108 may be laminated to the display panel 106 or adhered to the display panel 106 with an optically transparent adhesive, may be otherwise permanently or removably attached to the display panel 106, or may be unattached to the display panel 106 and may be retained in place by a chassis 114 or another component of the device 100. The light guide panel 108 may be substantially planar and may comprise one or more materials such as plastic, glass, aerogel, metal, ceramic, and so forth. The light guide panel 108 may be configured with one or more features on the surface thereof, or embedded within, which are configured to direct light along predetermined paths. These features may be diffractive, refractive, reflective, and so forth. Light that is incident on the light guide panel 108 from one, some, or all of the front (e.g., ambient light 102), the back (e.g., reflected light from the display panel 106), and any side of the light guide panel 108 may be directed along predetermined paths or may pass through the light guide panel 108 without alteration.

The light guide panel 108 may be configured to distribute at least a portion of light emitted from one or more illuminators 110 to a front side of the display panel 106. In some implementations the illuminators 110 may be configured to provide backlighting to the display panel 106. The illuminators 110 are shown in FIG. 1 in a cutaway view of the interior of the chassis 114, and are positioned to provide front lighting to the display panel 106. The illuminators 110 may be optically coupled to the light guide panel 108. The optical coupling between the light guide panel 108 and the one or more illuminators 110 may comprise one or more of physical proximity, an air gap, an adhesive, a mechanical interface, and so forth. In some implementations, one or more surface features may be provided on the light guide panel 108, the illuminator 110, or both. These surface features, such as diffusers, grooves, grating, dimples, lenses, planar surfaces, concave surfaces, convex surfaces, and so forth, may be used to enhance or attenuate the transmission of light between the one or more illuminators 110 and the light guide panel 108. In some implementations, these surface features may be separate or discrete elements which have been coupled to the light guide panel 108. For example, a microlens array may be adhered to the light guide panel 108 to aid the optical coupling with an illuminator 110.

The one or more illuminators 110 are configured to emit light when activated. The light emitted may comprise photons in infrared wavelengths, visible wavelengths, ultraviolet wavelengths, or a combination thereof. Each illuminator 110 may comprise one or more LEDs, cold cathode fluorescent lamp ("CCFL"), electroluminescent materials, sonoluminescent materials, fluorescent lights, incandescent lights, or a combination thereof. In some implementations, different types of illuminators 110 may be used in the same device 100. For example, electroluminescent lights may be used in conjunction with LEDs. The one or more illuminators 110 may be arranged along one or more edges of a perimeter 112 of the light guide panel 108. An illumination control module 118 may be coupled to the one or more illuminators 110 to control emitted light of the illuminators 110 as described further below.

Within the chassis 114 are one or more light sensors 116 configured to detect a flux of incident photons received by (i.e., incident on) the light sensor 116, and to generate and provide a signal indicative of that flux. The incident photons may comprise photons in infrared, visible, or ultraviolet wavelengths, or a combination thereof. The light sensor 116 may include, for example, a photocell, a phototransistor, a photoresistor, photodiodes, a reverse-biased LED, a photosensor, a single- or multi-pixel image sensor, a charge-coupled device (CCD), an active-pixel sensor (APS), a quantum optical detector, a photovoltaic cell, a photomultiplier, and/or a phototube. In some implementations, at least a portion of the one or more illuminators 110 may be used as a light sensor. For example, where the illuminator 110 comprises an LED, it may be reverse-biased to generate a signal indicative of incident photons. The light sensor 116 may comprise an analog, digital, or mixed analog-digital device. The light sensor 116 may include color detection capabilities and/or may only detect monochromatic light intensities. In some implementations, different types of light sensors 116 may be used on the same device 100. For example, one light sensor 116 sensitive to near infrared may be used as well as another light sensor 116 sensitive to visible light.

Figure 5:
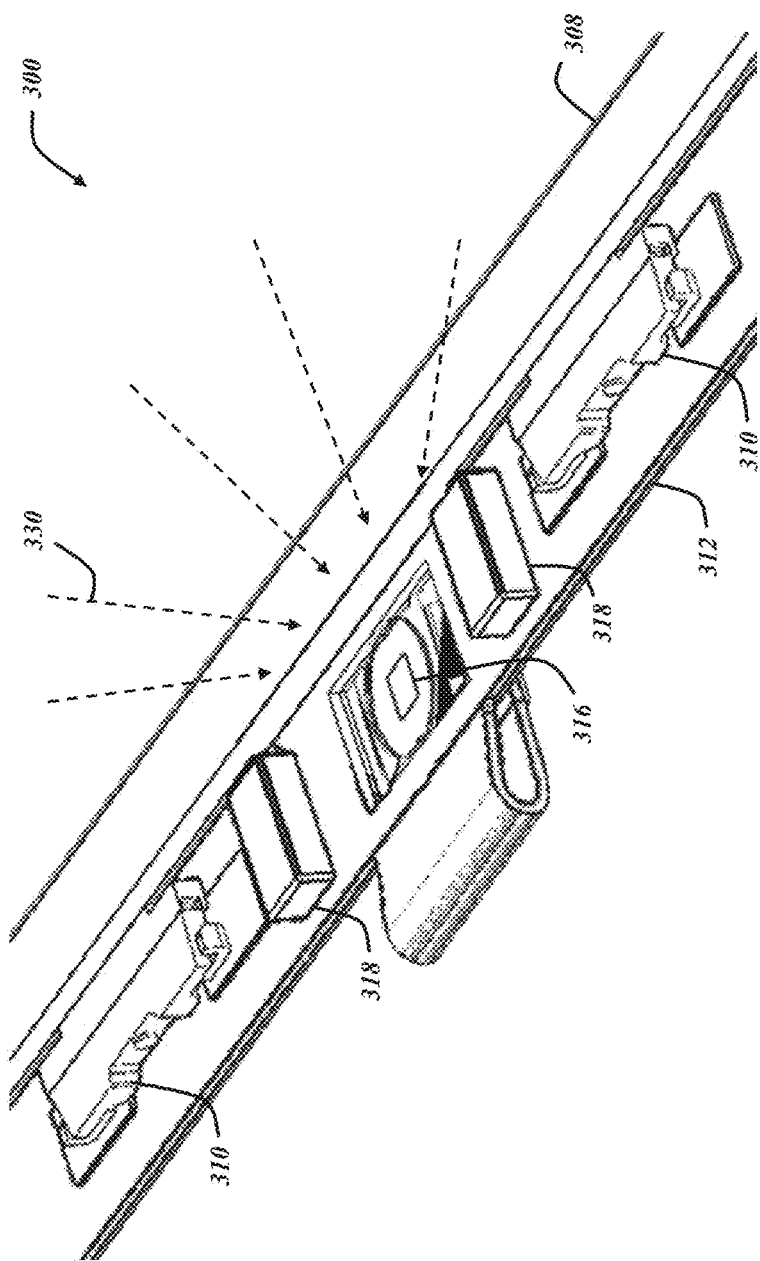
FIG. 5 is a close-up top perspective view of an assembly for a light guide panel, a light sensor, and a plurality of illuminators that communicate optically with a display panel of a device in accordance with various embodiments of the present systems and methods.

The one or more light sensors 116 may be positioned within the chassis 114. For example, FIG. 1 illustrates a light sensor 116 disposed at a midpoint of a short side of the rectangular chassis 114, while FIG. 5 illustrates a light sensor 316 disposed at a midpoint of a long side of the rectangular chassis 114. The light sensor 116 may be disposed beneath an edge of the chassis 114, such that the chassis 114 effectively isolates the light sensor 116 from the environment and prevents incidence of the ambient light 102 directly on the light sensor 116. The light sensor 116 may be disposed in optical communication with the display panel 106 such that at least a portion of reflected light reflected by the display panel 106 is directed to and/or received by the light sensors 116. In some embodiments, the one or more light sensors 116 may be optically coupled to the light guide panel 108 by any optical coupling means described above. The light guide panel 108 may direct one or more of ambient light from the environment, emitted light from the illuminators 110, and reflected light from the display panel 106 as described further below.

The illumination control module 118 may be a standalone hardware controller or processor, or the illumination control module 118 may be implemented in program instructions executable by a processor of the device 100. The illumination control module 118 may comprise an ambient light module 120 and an illuminator drive module 122. The ambient light module 120 may receive one or more signals from the one or more light sensors 116 and determine an ambient light level using one or more implementations of the ambient light measurement processes described herein. The ambient light module 120 may also determine a light intensity level of a mixture of ambient light and emitted light from the illuminators 110 using one or more implementations of the processes described herein. Further, the ambient light module 120 may be able to determine or calculate an emitted light intensity level of emitted light from the illuminators 110 from the measurements of the ambient light intensity and the mixed light intensity using one or more implementations of the processes described herein. The ambient light module 120 may further be configured to obtain content data to be rendered as content on the display panel 106 in order to perform the light measurement processes.

The illuminator drive module 122 may drive the one or more illuminators 110, such as activating them to emit light when in an active state or deactivating them to cease emitting light when in an inactive state. The illuminator drive module 122 may provide variable illumination intensity with the one or more illuminators 110. This variation in illumination may be provided to improve user experience, to reduce power consumption, and so forth. In some implementations, such as where the one or more illuminators 110 comprise LEDs, the illuminator drive module 122 may be configured to drive the LEDs with a pulse-width modulated (PWM) signal to create visible light having a first brightness level (e.g., a visible brightness level). In some implementations, the illuminator drive module 122 may be able to alter a current value provided to the illuminators 110 to affect the intensity of the light output by the illuminators 110, for example, during individual light pulses of a PWM light signal. This can resultantly affect the overall brightness level of the visible light output by the PWM modulated illuminators 110.

The ambient light module 120 may provide the ambient light level to the illuminator drive module 112, and the illuminator drive module may control the illuminators 110 to emit light at a brightness level associated with the ambient light level. This association may be provided by an illumination table, graph, or curve associating a range of ambient light levels with a range of brightness levels or illumination ranges. For example, the device 100 may be configured with a number (e.g., 20) of discrete brightness levels or illumination levels, and each brightness level may be associated with a corresponding ambient light level. Similarly, the ambient light module 120 may also provide the measured level of the mixture of ambient light and emitted light from the illuminators 110 to the illuminator drive module 112, and the illuminator drive module 112 may control the illuminators 110 to emit light at an intensity level that may compensate for illuminator performance variations (e.g., due to degradation over time, changes in temperature, etc.). Similarly still, the ambient light module 120 may provide a calculated or determined light intensity level attributable only to the illuminators 110 to the illuminator drive module 112, and the illuminator drive module 112 may control the illuminators 110 to emit light at an intensity level that may compensate for illuminator performance variations.

In some implementations, the ambient light module 120 may be configured to determine characteristics about the ambient light and/or the emitted light from the illuminators 110, such as color temperature. For example, the ambient light module 120 may receive data from the one or more light sensors 116 and determine a source of ambient illumination such as sunlight, fluorescent bulbs, incandescent bulbs, LEDs, and so forth. This determination may then be used to alter illumination. The determination of the source of ambient illumination may be provided to a display driver module to allow for adjustment of a presented image in response thereto, and so forth. For example, under a source of ambient light, which has a higher color temperature and thus appears more blue, the colors on a color display may be adjusted to maintain a desired output. Likewise, the illuminator drive module 122 may be configured to modify the light emitted by the one or more illuminators 110 to compensate at least in part for the source of ambient light.

In another implementation, the illuminators 110 and the illumination control module 118 may be omitted. In this implementation, the light guide panel 108 may be configured to direct at least a portion of the incident light to the light sensor 116. As above, changes to the ambient light level may be used to effect changes in the operation of the display panel 106, and vice versa. For example, presentation of information on the display panel 106 may be modified based at least in part on different light levels.

Figure 2:
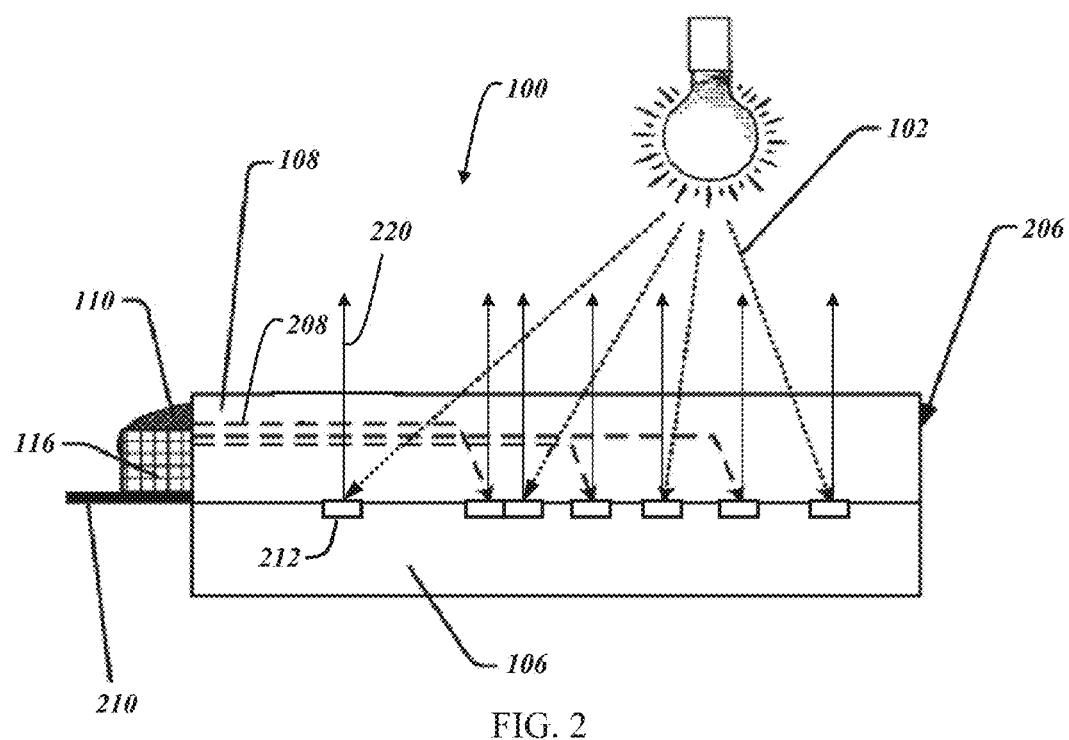
FIG. 2 is a diagrammatic cross-sectional side view of the device of FIG. 1, taken along line 2-2 of FIG. 1.
Figure 3:
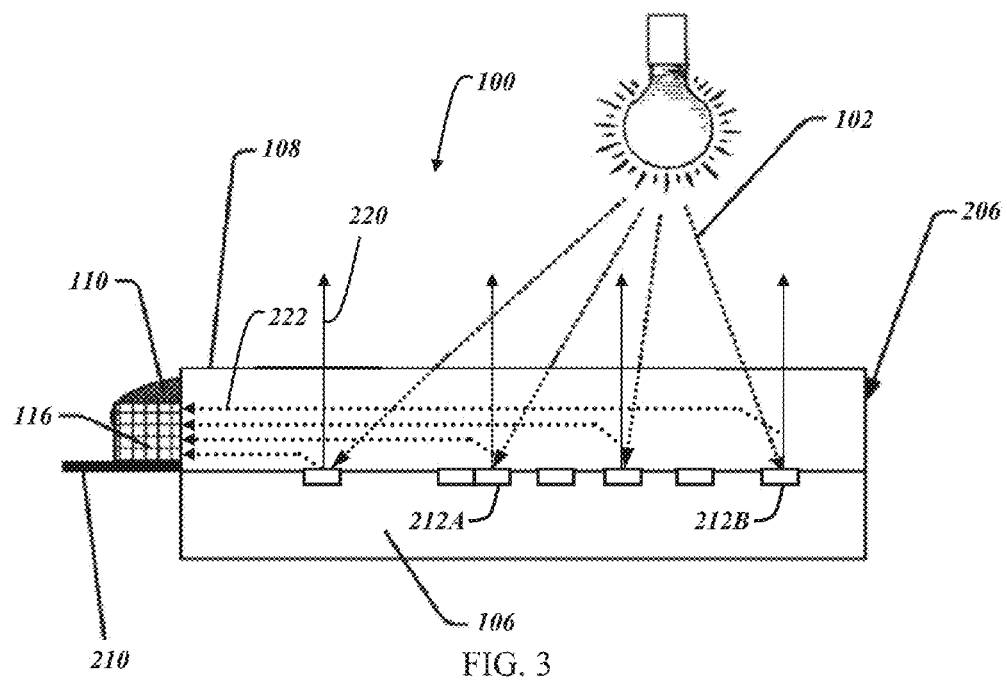
FIG. 3 is another diagrammatic cross-sectional side view of the device of FIG. 1, taken along line 2-2 of FIG. 1.
Figure 4:
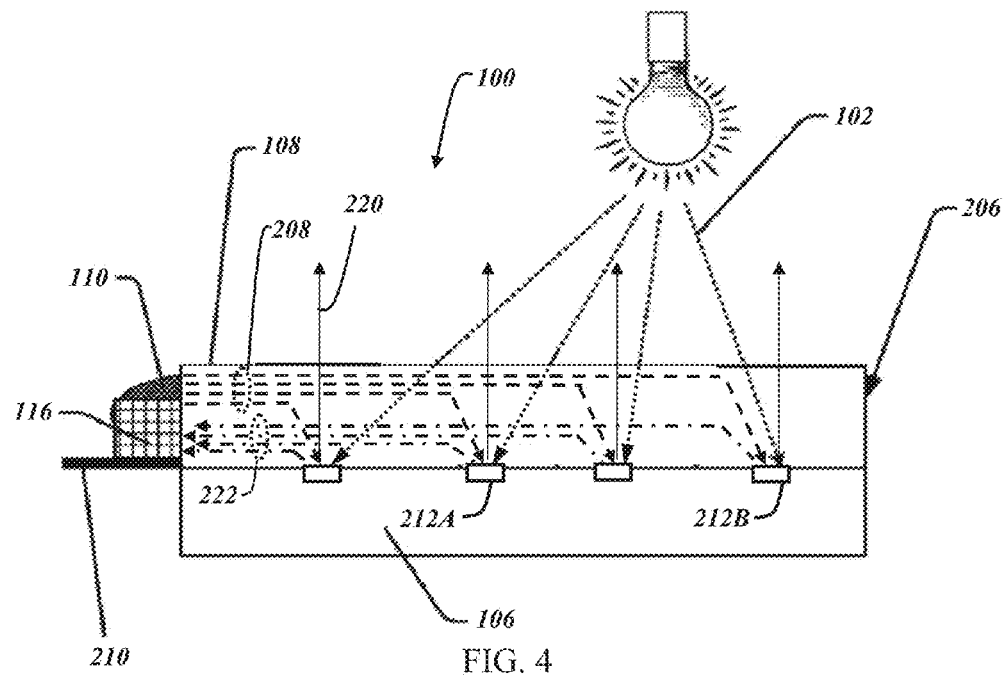
FIG. 4 is another diagrammatic cross-sectional side view of the device of FIG. 1, taken along line 2-2 of FIG. 1.

FIGS. 2, 3, and 4 illustrate a cross-sectional view of the device 100 in two different states. In FIG. 2, the illuminators 110 are in an active illuminated state and are communicating emitted light 208 into the light guide 108, which in turn distributes the emitted light 208 onto the display panel 106. In FIG. 3, the illuminators are in an inactive non-illuminated state. In FIG. 4, like FIG. 2, the illuminators 110 are again in an active illuminated state. However, FIG. 4 includes further detail not illustrated in FIG. 2.

In FIGS. 2, 3, and 4, the ambient light 102 is depicted as impinging on the light guide panel 108 which is in front of the display panel 106. Around the perimeter 112 (see FIG. 1) of the light guide panel 108 are one or more edges 206. These edges 206 are depicted here as being planar and generally perpendicular to the plane of the light guide panel 108. However, in other implementations, the edges 206 may be concave, convex, tapered, or have other shapes.

FIGS. 2, 3, and 4 illustrate that some or all of the ambient light 102 and/or emitted light 208 is reflected by the display panel 106, becoming reflected light 220 directed back toward the reader. FIG. 2 illustrates that some or all of the emitted light 208 may be directed onto the display panel 106 and reflected by the display panel 106 to become reflected light 220. The reflected light 220 (whether from ambient light 102, emitted light 208 from the illuminators 110, or from a combination thereof) forms, in part, the image seen by the user's eye. The amount of ambient light 102 and emitted light 208 that becomes reflected light 220 depends on the physical properties of the display panel 106, the physical properties of the light guide panel 108, and the composite brightness of all of the locations (i.e., points, display pixels 212, areas, etc.) that are impinged by the ambient light 102 and/or the emitted light 208. For example, the type and size of the display panel 106, the size of the display pixels 212, the thickness and material composition of the light guide panel 108, and the structures on or inside the light guide panel 108 that are used for directing light, may all affect the reflected light 220.

As is illustrated in FIGS. 3 and 4, a portion of the reflected light 220 is directed, by the light guide 108 or otherwise, to the light sensor 116 and becomes received light 222. FIG. 3 illustrates that the received light 222 includes only ambient light 102, while FIG. 4 illustrates that the received light 222 includes a mixture of both ambient light 102 and emitted light 208. For example, if the illuminators 110 are operated in a PWM scheme (e.g., to vary the brightness level of visible light from the illuminators 110), the illuminators 110 will be alternatingly activated (illuminated) and deactivated (not illuminated). During the periods of illumination, the received light 222 will include the mixture of both the ambient light 102 and the emitted light 208, as shown in FIG. 4. However, during the period of illuminator deactivation, the received light 222 will include only the ambient light 102, as shown in FIG. 3. Some illuminator types, for example, LEDs, can be activated and deactivated at high frequencies and with near-instantaneous changes in light output (e.g., instantly on or off), such that the transition from the state in FIG. 3 to the state in FIG. 4, and vice versa, occurs nearly instantaneously and at a switching frequency that is typically imperceptible to humans. The result is that the reflected light 220 is perceived by humans with a brightness level related to the ratio of time which the illuminators 110 is on vs off. However, the light sensor 116 can typically operate a speeds fast enough to detect the received light 222 in its two distinct states. Certain complications may arise, however, and are, in part, a focus of portions of certain embodiments disclosed herein.

In some embodiments, the received light 222 couples into the light guide panel 108 due to the internal structures of the light guide panel 108 where the reflected light 220 is incident; the structure and arrangement of the light guide 108 therefore may determine how much of the reflected light 220 become received light 222. The structures of the light guide panel 108 that direct the received light 222 to the light sensor may be surface features, internal features, or both, and may be used to enhance or attenuate the transmission of light between the light guide panel 108 and the light sensor 116. In some implementations, surface features may be diffusers, grooves, grating, dimples, lenses, planar surfaces, concave surfaces, convex surfaces, and so forth. In some implementations, regions with materials of differing indices of refraction may be used to form internal features to direct light within the light guide panel 108 or to interface points such as proximate to the one or more illuminators 110, light sensors 116, the front of the display panel 106, and so forth. Alternatively, the device 100 may not have a light guide 108, and/or the received light 222 may travel directly from the display panel 106 to the light sensor 116.

In some embodiments, the display panel 106 may be evaluated by considering the contributions to the total amount of received light 222 from each display pixel 212 or from a subset of display pixels 212, as described further below. The physical structures and physical properties that influence the amount of received light 222 may be substantially static or unchanging; the influential variable parameters affecting the contribution of a particular location are the brightness and the distance (and also the direction, in some embodiments) of the location from the light sensor. To wit, from the point of view of a plane including the display panel 106 and the light sensor 116, each display pixel 212 of the display panel 106 may be considered a point source "emitting" (e.g., reflecting) a field of light in all directions (i.e., 360 degrees) within the plane. A first display pixel 212A that is substantially closer to the light sensor 116 than a second display pixel 212B may, when the display pixels 212A-B have the same brightness, contribute a greater amount of the received light 222 than the second display pixel 212 B contributes due to less expansion of the first display pixel's 212A light field. Additionally, both the distance and the direction of the location may determine which structures within the light guide panel 108 will affect the path of the reflected light 220 that couples into the light guide panel 108; the structures may direct light away from the light sensor 116 (e.g., out of the front of the light guide panel to the viewer), further reducing the contribution of the associated display pixel 212, or may direct light toward the light sensor 116, amplifying such contribution.

Because the physical structures and physical properties of the device 100 that influence the amount of received light 222 may be substantially static or unchanging, the light transmission properties of the device 100 may be modeled by applying a model (i.e., known) ambient light level to the device, displaying a plurality of instances of model content, and measuring the received light 222 as desired. Modeling may provide data describing the relationships between the properties of some or all of the display pixels 212 and the received light 222. For example, measuring changes in the received light 222 when the brightnesses of certain display pixels 212 at equal or different distances and/or directions from the light sensor 116 are varied can model a decay of received light percentage at increasing distance (see FIG. 21) in multiple directions. In some embodiments, characterization functions and/or lookup tables of raw values, which may be specific to the device 100, may be derived by modeling the device 100. Non-limiting examples described herein include a content type lookup table, an intensity map, and a plurality of associations between values, percentages, and ranges.

The illuminator 110 is shown optically coupled to one of the edges 206 of the light guide panel 108. In one implementation, the illuminator 110 may comprise a side-firing LED, with an emission side abutting the edge 206. The light guide panel 108 distributes the emitted light 208 in order to frontlight or illuminate the display panel 106 and the image presented thereon. Interaction between the ambient light 102 and the emitted light 208, and indeed between any two light sources (e.g., the ambient light 102 and the reflected light 220), while propagating within the light guide panel 108 is minimal, such that the rays do not interfere with one another to a substantial degree. The light sensor 116 is also shown optically coupled to the light guide panel 108 proximate to the one or more illuminators 110 on the same edge 206 of the light guide panel 108, but the light sensor 116 may be on another edge 206. The illuminator 110, the light sensor 116, or both, may be affixed to a printed circuit 210. This printed circuit 210 may comprise flexible materials including, but not limited to, flexible printed circuits comprising a plastic and metallic laminate, polyimide, polyether ether ketone, and so forth. In some implementations, the printed circuit 210 may be rigid or semi-rigid, or a combination of flexible, rigid, and semi-rigid materials.

FIG. 5 illustrates another embodiment of a device 300, which is similar to the device 100 and further includes an assembly for reducing interference of illuminators 310 with a light sensor 316. The light sensor 316 may be similar to the light sensor 116 described above, just as the illuminators 310 and light guide panel 308 and the optical coupling between the components may be substantially as described above. The light sensor 316 and illuminators 110 may be disposed on a printed circuit 312 like the printed circuit 210 described above. Additionally, one or more light blocking structures 318 may be disposed between the light sensor 316 and any adjacent illuminators 310 to prevent incidence of emitted light on the light sensor 316 as the light sensor 316 collects reflected light 330.

Figure 6:
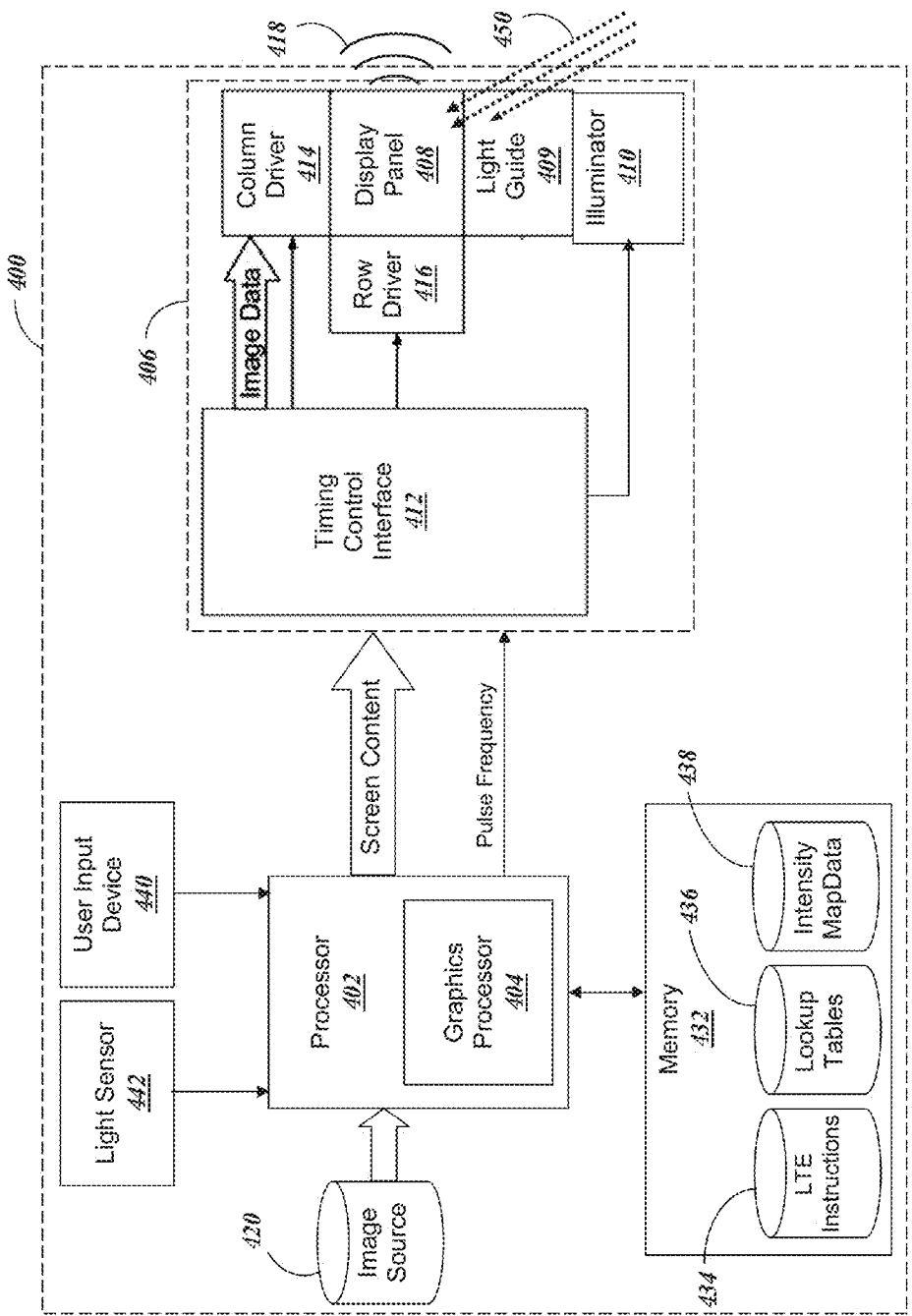
FIG. 6 is a schematic view of another exemplary computing device, according to various embodiments of the present systems and methods.

FIG. 6 diagrammatically illustrates an exemplary device 400 that may be any of the devices 100, 300 described above or a similar device having processing means and a display. A processor 402 may be a central processor, a microprocessor, a group of parallel processors, and the like, which performs routine processing tasks such as executing programs and processing data, and can be specially configured to perform other operations by executing program instructions. Similarly, a graphics processor 404 may perform graphics processing tasks such as image and video processing, content buffering, two- and three-dimensional graphics computation and generation, and the like. The graphics processor 404 may be on-board (i.e., integrated with) the central processor 402, or may be a separate component in electronic communication with the central processor 402. The central processor 402 or the graphics processor 404, or both, with or without other processors, may perform the unique image, light, and other data processing described herein. In some embodiments, the central processor 402 may implement, as software, or control, as hardware and/or circuitry, modules such as the illumination control module 118, ambient light module 120, and illuminator drive module 122 of FIG. 1.

A display 406 may communicate with the processors 402, 404 and may receive content data to be presented to a viewer. The display 406 may be integrated into a single housing with the other components of the computing device 400, such as with a tablet computer or e-reader, or the display 406 may be a separate component, such as with a desktop computer and monitor. The display 406 may be any type of display device and use any type of display technology suitable for the computing device 400, including any of the display types and technologies described above; the ambient light measurement processes described herein do not require modifications to the display 406 hardware. The exemplary device 400 is illustrated and described with respect to a front-lit EPD as the display 406, but this choice of exemplary display 406 is not limiting.

The display 406 includes a display panel 408, a light guide panel 409, a front light 410, a timing control interface 412, a column driver 414, and a row driver 416. In some examples, the computing device 400 or the display 406 may include one or more additional components associated with operation of the display 406, such as a touch sensor component layered atop the light guide 409 for detecting touch inputs, or a dedicated power supply for powering the display 406 components. The display panel 408 displays content (i.e., the rendered content data, which may include processed text and images) to the viewer. The display panel 408 may be made up of rows and columns of picture elements ("pixels," referred to herein as display pixels to differentiate from the pixels of a digital image) that form a two-dimensional matrix. The display panel 408 may be an array of reflective display pixels; light (i.e. ambient light 450 and/or emitted light from the front light 410) incident on the display panel 408 enters the display pixels and reflects back out of open pixels to a viewer. The amount of light that reflects from the display pixels back to the viewer when all of the display pixels are all fully open (i.e., reflecting white light at maximum achievable intensity, showing a completely white image (or, the whitest possible image) on the display panel 408) determines the luminance, or maximum "brightness," of the viewing screen (i.e., the front surface of the display panel 108).

The display panel 408 in some displays 406 can self-illuminate, while others require light supplied by an illuminator 410, which may be a front light and may correspond to the illuminators 110 of FIG. 1. The illuminator 410 emits controlled light onto the reflective display pixels of the display panel 408 via the light guide panel 409 as described above. In other embodiments, the display panel 408 is implemented as an array of transmissive pixels, and the illuminator 410 may instead be implemented as a back light. In which case, when activated, the back light causes light to pass through the open display pixels of the display panel 408 to a viewer.

In one embodiment, the illuminator 410 may receive a voltage and a current value that drive the illuminator's 410 light emission at a corresponding emitted light intensity level. For example, if the illuminator 410 is an LED, the emitted light intensity level is directly related to the amount of current that passes through the illuminator 410 such that a higher emitted light intensity level is achieved with a higher current, and vice versa. In one specific embodiment, for example, the illuminator 410 is driven by a repeatedly pulsed voltage signal. With brief reference to FIG. 7, such a pulsed signal is illustrated at 702. When the pulse is high, the illuminator 410 switches on at a set current value and emits light. When the pulse is low, the illuminator 410 switches off. The switching occurs at a sufficiently high frequency such that the switching is imperceptible to humans (i.e., it occurs above a flicker fusion threshold frequency, e.g., above 60-75 Hz for typical applications, though the flicker fusion threshold frequency can be higher if shorter illumination pulses are utilized, e.g., with a smaller duty cycle, discussed below).

Because the human eye cannot perceive the individual light pulses emitted at these higher frequencies, the human eye instead perceives a steady visible light at a certain brightness level. The brightness level (e.g., the first brightness level) of the visible light corresponds to a ratio of the time the illuminator 410 is illuminated compared to the time the illuminator 410 is off. In one embodiment, this on/off ratio can be defined as the "duty cycle" of the PWM signal, and is mathematically defined as: $\text{Duty\_Cycle} = t_{on}/(t_{on} + t_{off})$, where $t_{on}$ is the time during which the illuminator 410 is illuminated and $t_{off}$ is the time during which the illuminator 410 is off. The perceived brightness level will be less than the instantaneous emitted light intensity level during each one of the individual light pulses (unless, of course, the duty cycle is 100%, indicating the illuminator 410 is constantly illuminated, in which case the perceived brightness level will be the same as the emitted light intensity level). For example, the PWM signal 702 of FIG. 7 will generate a visible light having a brightness level higher than the PWM signal 802 of FIG. 8; however, both PWM signals 702 and 802 will result in brightness levels that are less than the emitted light intensity level of the individual light pulses. In various approaches, the correlation between the brightness level and the PWM duty cycle of the PWM signal can be mathematically estimated or otherwise represented in a linear relationship, an S-curve relationship, a log relationship, an exponential relationship, or other suitable mathematical relationship or combination thereof. In certain embodiments, the brightness level of the visible light can be adjusted by varying the PWM duty cycle in accordance with the mathematical relationship.

The illuminator 410 may generate the visible light at a first brightness level according to a selected setting of a plurality of illuminator settings, and/or the brightness level may be continuously variable. The brightness level of the visible light may be set to be within one of a plurality of levels of brightness (e.g., 20 levels), or may be as finely tuned as the timing resolution of the device 400 and/or processor 402 can accommodate.

PWM modulation of illuminators allows for greater control over the perceptible visible brightness of the illuminator without drastically changing current or voltage levels provided to the illuminator 410. Further, and particularly with LEDs, visual characteristics (e.g., color, color temperature, etc.) of the emitted light may change with particularly low or high currents. If a non-pulsed voltage is applied to the illuminator 410 (e.g., in the absence of PWM), changing the brightness level by reducing the current through the illuminator 410 may change a perceived visual characteristics of the visible light, particularly when operating at dimmer levels. PWM will keep the characteristics (e.g., color) of the individual pulses of light from the illuminator 410 relatively identical by using the same current through the illuminator 410 during each pulse and only changing the perceived visual brightness level by changing the duty cycle. Further still, PWM switching schemes can provide additional power savings benefits over constant illumination techniques.

In other embodiments, the illuminator 410 may instead use a pulse-duration modulation scheme, wherein the duration of an illuminated pulse (e.g., $t_{on}$) may vary while the duration of the time the illuminator 410 is off between pulses (e.g., $t_{off}$) remains unchanged. In this approach, unlike PWM approaches, the frequency at which the pulses of emitted light can change with the duration of the illuminated pulse (e.g., the frequency becomes slower when the illuminated pulse becomes longer when increasing the brightness level). Similarly still, a pulse-density modulation (PDM) approach may be utilized, wherein a density of the number of pulses of emitted light creates the perceived brightness level. For example, a higher density of light pulses results in a greater brightness level, whereas a lower density of light pulses results in a lower brightness level. However, a flickering effect may be perceived at lower brightness levels if the pulse density becomes too low (e.g., too infrequent, such that the pulse frequency drops below a flicker fusion threshold).

In various embodiments, the illuminator 410 may be controlled by the processor 402 directly or through the timing control interface 412. Generally, the timing control interface 412 may operate the illuminator 410 in a PWM scheme at a relatively high pulse frequency, such as between 75 Hz and 200 Hz. The timing control interface 412 may receive the pulse frequency from the processor 402. The timing control interface 412 further controls the column driver 414 and the row driver 416 to apply electrical signals to the display pixels, setting the display pixels in the proper sequence to display a corresponding image. The timing control interface 412 controls the column driver 414 and the row driver 416 using one or more addressing schemes that are included in the timing control interface 412 as either software or firmware. To coordinate the illuminator 410 with the column driver 414 and the row driver 416, the timing control interface 412 may adjust the output of the front light 410 at a rate about equal to the address period of the device 400. The timing control interface 412 can adjust or change the output of the illuminator 410 each time the timing control interface 412 may also change the driving voltage being supplied to the display pixels of the display panel 408. Alternatively, the two systems may operate at asynchronous frequencies.

When the display pixels are set by the column driver 414 and the row driver 416 to display an image, such as a test or calibration image, a screen brightness 418 associated with an output brightness level may be determined (e.g., in candelas per square meter ($cd/m^2$), or nits) and associated with that brightness level (e.g., stored in memory 432). A calibration image may be, for example, a completely white image that covers the entire viewable screen. In that case, the brightness 418 associated with different brightness levels would approximate the maximum brightness achievable at those brightness levels.

Figure 14:
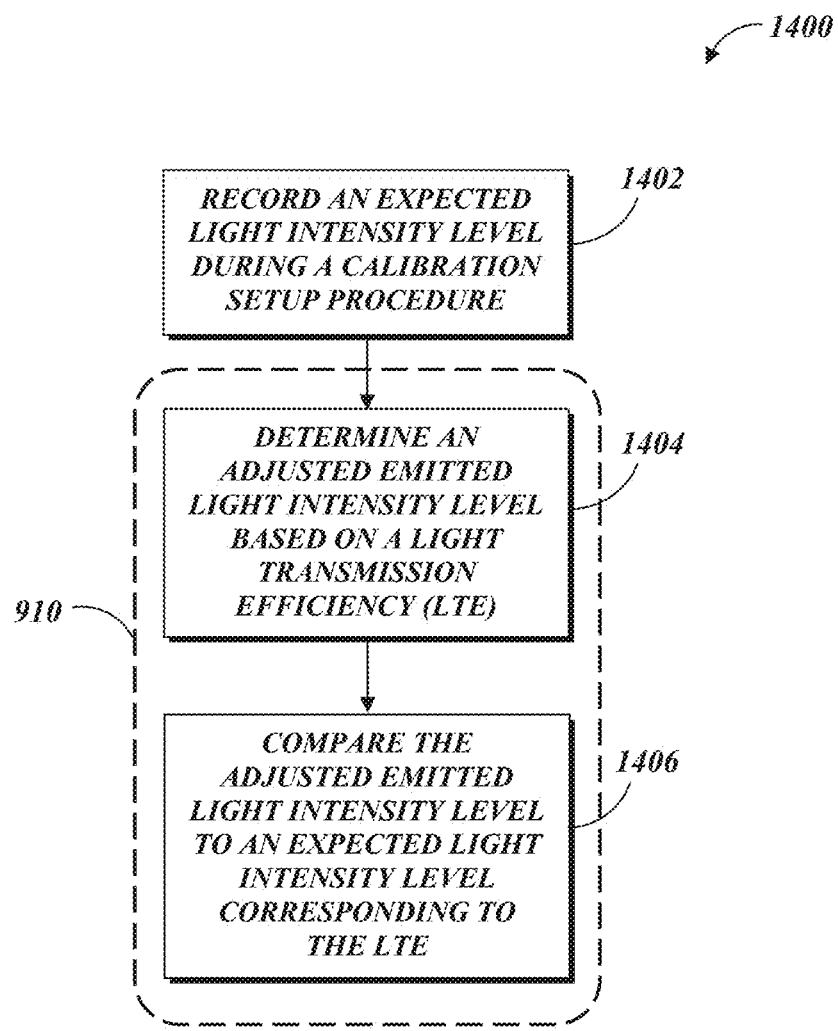
FIG. 14 is flowchart illustrating an exemplary method of comparing an emitted light intensity level to an expected light intensity level, according to various embodiments.

In one approach, a light intensity level is sensed by the light sensor 442, recorded by the processor 402, and stored in the memory 432 as an expected light intensity level during a calibration setup procedure. FIG. 14 illustrates this step at 1402. The expected light intensity level represents the expected light intensity level attributable only to the illuminators 410 and takes into account the individual static variations, tolerances, and differences present in each assembled display device 400, such as, for example, slight variations in reflectivity of the display panel 408, variations in the light guide 409, variations in the brightness, color, or dispersion of the illuminators 410, and variations in the particular light sensitivity of the light sensor 442, for example. As many of these aspects are relatively static once assembled (except for illuminator performance over time or over temperature, as discussed above), the calibration setup procedure can account for these variations to calibrate the illumination system as a whole. The calibration setup procedure may be performed by or at a manufacturing facility as a step in the procedure during manufacture the display device 400.

In one example, the display device 400 may be placed in a room or a structure entirely absent of ambient light. Alternatively or additionally, the display device 400 may be covered in a light-absorbing material to prevent incident exposure of ambient light onto the display panel 408. Further, the light-absorbing material may prevent and/or reduce the reflection of emitted light from the illuminators exiting the display device 400 back to the display panel 408 from the covering material, which may then act as ambient light. The illuminators 410 may be illuminated with a known current value (e.g., 20 mA). Alternatively, the illuminators 410 may be illuminated with a current value necessary to achieve a particular specified light intensity level at one or more locations in front of and/or at a distance from the front surface of the display panel 408 (e.g., in a position to mimic or test a light intensity level as may be perceived by a user holding the display device 400). The current value can be adjusted until the specified light intensity level is achieved, and the display device 400 may record the current value (e.g., in the memory 432) or otherwise be calibrated accordingly such that it achieves the specified light intensity.

During the calibration setup procedure, the illuminators 410 are illuminated with a known current value (e.g., a simple set current value or the calibrated current value discussed above) in a steady manner (e.g., with 100% duty cycle) or otherwise in a manner to ensure that the illuminators 410 are illuminated during the entirety of a sampling period or integration period of the light sensor 442. In this approach, the instantaneous light intensity level of the light emitted by the illuminators 410 is sampled by the light sensor 442 and recorded as the expected light intensity level. Because the expected light intensity level is measured and recorded in the absence of ambient light, the expected light intensity level represents only the expected light intensity level attributable to the illuminators 410 as may be measured by the light sensor 442. These procedures may be repeated with varying emitted light intensities from the illuminators 410 and with varying calibration images (e.g., having varying light transmission efficiency (LTE) levels, as discussed below) to allow for a plurality of expected light intensity levels to be recorded and associated with a plurality of different operating conditions. Many variations are possible for the procedure to properly calibrate the display device 400 to account for variations due to the illuminator 410, the light sensor 442, and other elements.

Alternatively or additionally, the display device may be exposed to a controlled ambient light of a precise known intensity level during a calibration setup procedure. With the illuminators 410 off, the light sensor 442 may then sense an ambient light intensity level caused by the controlled ambient light and record the sensed ambient light intensity level as a calibrated ambient light intensity level. Such an arrangement may resemble the light paths illustrated in FIG. 3. Subsequent to determining the calibrated ambient light intensity level, the display device 400 may illuminate the illuminators 410 with the known current value (e.g., a simple set current value or the calibrated current value discussed above) in a steady manner. Another calibration sample may be generated by the light sensor 442 that captures both the controlled ambient light and the emitted light from the illuminators 410 as a combined light intensity level. Because the portion of the combined light intensity level attributable to the ambient light is known (as a calibrated ambient light intensity level), that portion can be subtracted from the combined light intensity level to determine a light intensity level portion attributable to the illuminators 410. The calculated portion attributable to the illuminators 410 can be saved as the expected light intensity level, as discussed above. Other calibration procedures and variations are possible to determine the expected light intensity level representing only the expected light intensity level attributable to the illuminators 410 and measured by the light sensor 442.

In normal operation, to display content to a viewer the central processor 402 obtains or receives an image, video, data stream (e.g., a text buffer), or other visual data from an image source 420. A video or data stream generally represents a sequence of pixel display values (referred to herein as pixels to differentiate from the display pixels of the display panel 408), grouped per line; a sequence of lines, grouped per frame (equivalent to a static image); and a sequence of frames defining a frame sequence. The image, video frame, page of text, or other still frame of visual data to be displayed is referred to herein as the content. In some embodiments, the image source 420 may be a frame buffer for the display 406, and the content data corresponding to the content may be a frame of pixels and the corresponding pixel data. Each pixel in the content data corresponds to one of the display pixels in the display panel 408, and the pixel data determines the display properties of the corresponding display pixel when the display panel 408 is displaying the content. For EPDs and other monochromatic displays, the pixel data for each pixel includes a brightness value representing the brightness of the corresponding display pixel. In embodiments where the display 408 is a color display, the pixel data for each pixel includes red, green, and blue saturation values, and may also include an opacity value known as an alpha channel. The processor(s) 402 processes the pixel data and other image data to prepare the content for rendering to the display 406. The processing tasks may depend on the content, the settings of the display 406, other input values, operating modes, etc.

The processor 402 may perform tasks and configure other device components for performing the ambient light measurements by accessing memory 432, executing program instructions 434 stored in the memory 432, and, in some embodiments, retrieving one or more lookup tables 436 and/or one or more intensity maps 438 stored in the memory 432, as described below. The memory 432 may be located on the computing device 400 or remotely therefrom, but accessible by the processor 402 in any case. Additionally, the lookup tables 436 and/or intensity map(s) 438 may be stored in other locations. The lookup tables 436 and/or intensity map(s) 438 may be stored in any format, file or storage scheme. In one embodiment, the lookup tables 436 and/or intensity map(s) 438 may each databases storing records. In another embodiment, the memory 432 may store the intensity maps 438 as lookup tables. In still other embodiments, the lookup tables 436 and/or intensity map(s) 438 may be stored in one or more hash trees or other search-optimized data structures.

The program instructions 434 enable the processor 402 to determine the light transmission efficiency (LTE) of the display panel 408 when the display panel is displaying the content, and to calculate the ambient light level and/or the emitted light intensity level from the LTE. The program instructions 434 further enable the processor 402 to determine, from the ambient light level and/or the emitted light intensity level, the optimal setting for the illuminator 410 or other optical system that illuminates the display panel 408. The processor 402 may execute the program instructions 434 to perform the methods and other tasks described herein. The lookup tables 436 may include the content type lookup table described below with respect to FIGS. 18-19, and may further include one or more lookup tables recording any of the described associations and/or correspondences between values, percentages, ranges, and other data used in the ambient light measurement processes. Thus, steps of "determining," "identifying," "matching," and the like, may include accessing one or more lookup tables 436 using a known value of a first parameter in order to find a needed value of a second parameter associated with the first parameter.

In some embodiments, the processor 402 may receive a user input, such as selection of a brightness level, from a user input device 440 in communication with the processor 402. In some embodiments, the processor 402 may receive light sensor data, such as a signal containing a detected light level, from a light sensor 442 as described above.

Figure 7:
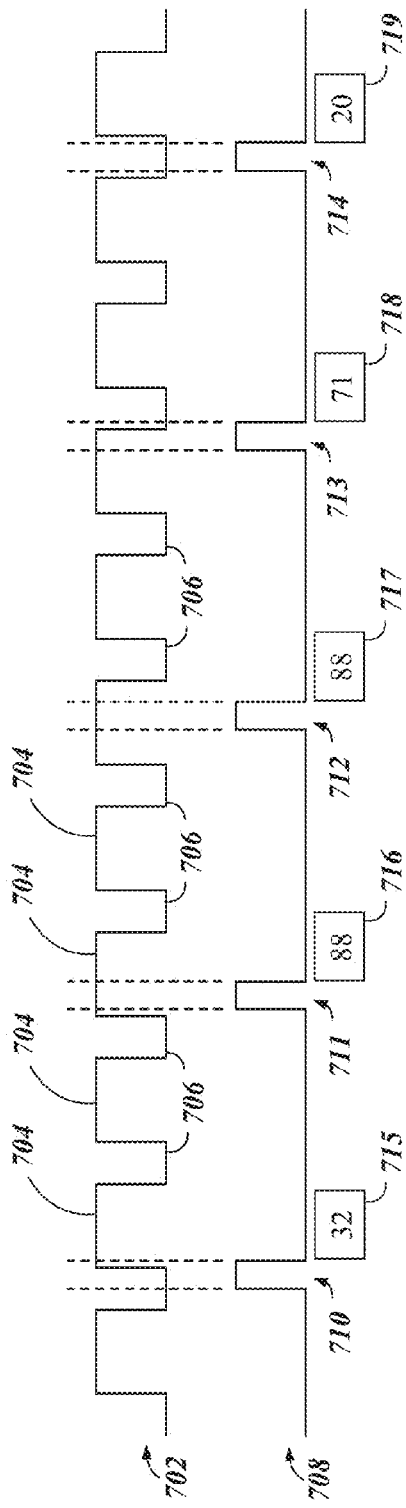
FIG. 7 is an example signal diagram illustrating aspects of various embodiments of the present systems and methods.
Figure 8:
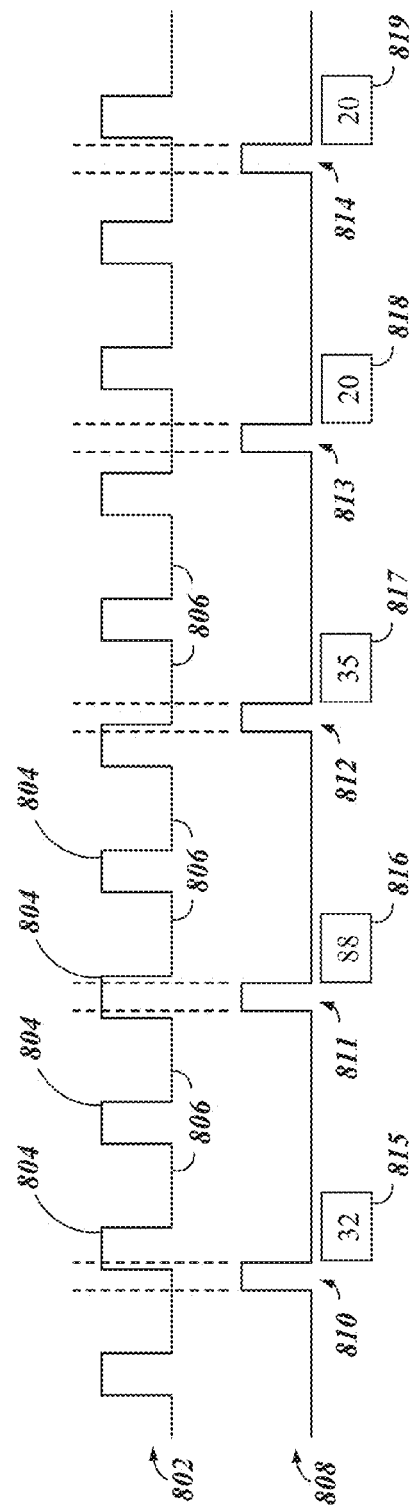
FIG. 8 is another example signal diagram illustrating aspects of various embodiments of the present systems and methods.

FIGS. 7 and 8 show example signal diagrams illustrating example uses of a pulse-width modulation (PWM) scheme for an illuminator 410 to control a brightness level (e.g., the first brightness level) of visible light from the illuminator 410, as discussed above. In FIG. 7, the PWM signal 702 controls the illuminator 410 or is otherwise representative of the operation of the illuminator 410 over time (e.g., the horizontal axis). The PWM signal 702 includes or corresponds to a series of light pulses 704 that are emitted by the illuminator 410. The series of light pulses 704 includes individual periods of illumination (e.g., the pulses 704) where the illuminator 410 is illuminated, for example, at a first current value (e.g., 20 mA). The individual periods of illumination (e.g., pulses 704) may each be offset from one another by individual periods of illuminator deactivation 706 where the illuminator 410 is off. Similarly, in FIG. 8, the PWM signal 802 includes the series of light pulses 804 and periods of illuminator deactivation 806. PWM signals 702 and 802 may be segments of the same overall PWM signal controlling the same illuminator 410, with each segment simply occurring at different times and with different duty cycles. The primary difference between PWM signal 702 and PWM signal 802 is that PWM signal 702 has a higher duty cycle (about 75%) than that of PWM signal 802 (about 25%). Accordingly, given the same PWM frequency (as is illustrated in FIGS. 7 and 8) and same current value applied to the illuminator 410 during light pulse periods 702 and 802, PWM signal 702 will result in a higher brightness level reflected from the display panel 408 to a user of the display device 400 than would PWM signal 802.

The first current value that is applied to the illuminator 410 during the individual light pulses 704 and 804 may be the calibrated current value discussed above, or may simply be a set default current value, for example, at which the illuminators 410 may operate during their initial lifespan and/or when the display device 400 is initially activated or turned on. As is discussed below, this first current value may change over time to a second current value (or to various other current values) based on performance variations of the illuminators 410.

FIGS. 7 and 8 also illustrate a light sensor sampling activity signal 708 and 808 that indicate a plurality of sampling periods, for example, sampling periods 710-714 and 810-814. The light sensor sampling activity signal 708 and 808 may control or otherwise indicate active operation of the light sensor 442, for example, while sampling light. Many types of light sensors require a period of time (e.g., a sampling period or integration period) to acquire enough light (e.g., enough photons) to generate a sample light intensity value. Accordingly, light sensor sampling activity signals 708 and 808 may control or indicate the sampling periods during which the light sensor 442 actively samples light (e.g., light 222, shown in FIGS. 3 and 4). Example representative light intensity values that may be generated by the light sensor 442 are indicated at 715-719 and 815-819. The example representative light intensity values 715-719 and 815-819 may be represented as a percentage of a maximum output of the light sensor, however, many other variations in values and representations are possible. The light sensor 442 may output an analog voltage or current that may be converted to a digital representation of that analog signal by an analog-to-digital converter that may be part of or separate from the processor 402. Alternatively, the light sensor 442 may output a digital signal.

Typically, a longer sampling period results in more accurate light intensity values. A longer sampling period, particularly with low light levels, allows additional time for light (e.g., photons) to be captured and measured by the light sensor 442, which can in turn increase a signal-to-noise ratio of the light sensor 442 as more signal is generated due to the additional captured light. This decreases the impact of electrical "noise" caused by electromagnetic activity, sampling tolerance, and random optical interference, which could otherwise impact the accuracy of light intensity value.

In some embodiments, the sampling period is between 2 ms and 5 ms, but the sampling period can be slightly lower or higher with different technologies, arrangements, configurations, or with different precision requirements. However, as is discussed below, an increase in the sampling period time may lead to a reduced ability or probability of capturing light intensity samples exclusively during a light pulse 704 and 804 or exclusively during a period of illuminator deactivation 706, 806. In various embodiments, the sampling periods may occur with a frequency such that sampling occurs about every 100 ms. However, a different sampling frequency may be selected. Alternatively, the sampling frequency can be variable according to the needs of the system.

In one example, assuming a 75 Hz PWM frequency for PWM signal 702 in FIG. 7, a new light pulse 704 will occur every 13.33 ms. With an example 75% duty cycle, a light pulse 704 will last 10 ms, while a period of illuminator deactivation will last only 3.33 ms. Conversely, with example PWM signal 802 of FIG. 8 having only a 25% duty cycle, a light pulse 704 will last only 3.33 ms, while a period of illuminator deactivation will last 10 ms. If the sampling period duration where to exceed 3.33 ms, given these characteristics in this example, there would be no possibility for the sampling period to occur exclusively during a light pulse (e.g., during short light pulses 806) and during a period of illuminator deactivation (e.g., during short periods of illuminator deactivation 706). Here, only one of the two required measurements would be possible in each scenario. Thus, in certain embodiments, the maximum duration of the sampling period may be calculated in accordance with maximum and/or minimum duty cycles and with the PWM frequency. As is discussed below, however, other options may be possible to overcome restrictions on the sampling period duration.

It is desired to capture light intensity samples that either include a light pulse 704, 804 for the entirety of the sampling period (e.g., as is shown by sampling periods 711, 712, and 811) or do not include any portion of the light pulse 704, 804 during the sampling period (e.g., as is shown by sampling periods 714, 813, and 814). Light intensity samples that include portions of light pulses 704, 804 as well as periods of illuminator deactivation 706, 806 (e.g., as is shown by sampling periods 710, 713, 810, and 812) will not provide a light intensity sample value attributable purely to the ambient light 102 (as is shown in FIG. 3) or purely to the mixture of ambient light 102 and emitted light 208 (as is shown in FIG. 4). By changing the state of the illuminator 410 sometime in the middle of the sampling period (e.g., as with sampling periods 710, 713, 810, and 812), the resulting light intensity sample will generate a random value that represents neither of the two illumination states.

A sampling period that occurs exclusively within an individual light pulse period 704 or 804 (e.g., sampling periods 711, 712, and 811) yields a usable light intensity value that represents the intensity of the combination of the ambient light 102 and the emitted light 208 from the illuminator 410. Similarly, a sampling period that occurs exclusively within an individual period of illuminator deactivation 706 or 806 (e.g., sampling periods 714, 813, and 814) yields a usable light intensity value that represents the intensity of only the ambient light 102. A difference (subtraction) between these two intensity values results in a calculated determination of an emitted light intensity level attributed only to the emitted light 208 from the illuminator 410. This may be represented mathematically as $I_{(ambient+emitted)} - I_{ambient} = I_{emitted}$, where $I_{(ambient+emitted)}$ is the measured light intensity value that represents the intensity of the combination of the ambient light 102 and the emitted light 208 from the illuminator 410, wherein $I_{ambient}$ is the measured light intensity value that represents the intensity of only the ambient light 102, and where $I_{emitted}$ is the calculated emitted light intensity level attributed only to the emitted light 208.

Figure 9:
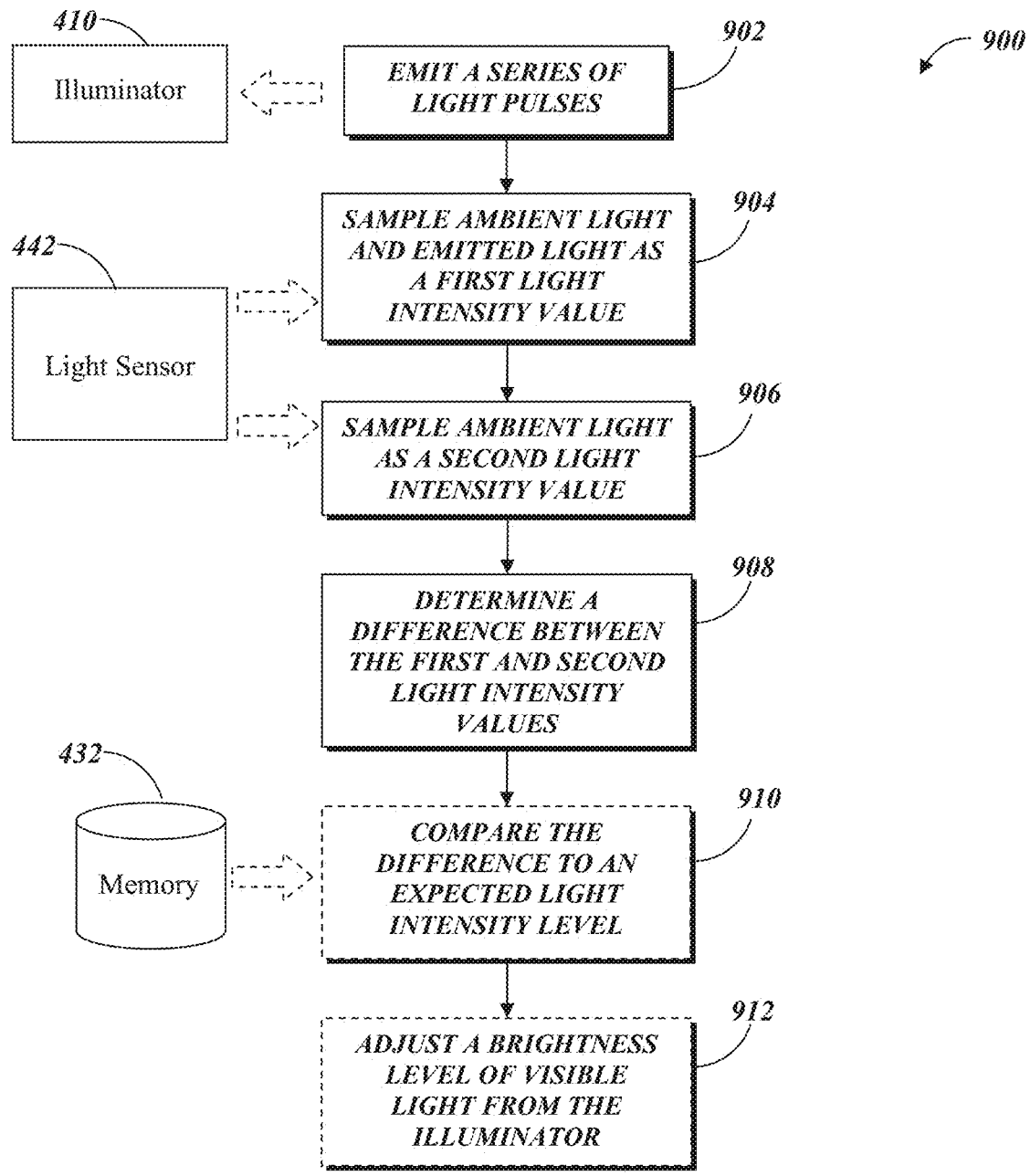
FIG. 9 is a flowchart illustrating an exemplary method of determining an emitted light intensity level attributed to the illuminator, according to various embodiments.

FIG. 9 illustrates an exemplary method 900 performed by the device 400, or another device such as the devices 100, 300 described herein, for determining an emitted light intensity value attributed to the illuminator 410, for example, even in the presence of ambient light 102. In accordance with further embodiments, the method 900 may also be for compensating for performance variations of the illuminator 410, for example, of a reflective display device. In various embodiments, the processor 402 may be configured to perform various portions of the method 900, for example, though programming instructions stored in memory 432, though hardwired configurations, or a combination thereof.

At step 902, an illuminator 410 emits a series of light pulses 704 or 804. As discussed above, the series of light pulses may include a PWM series and may be emitted or otherwise directed onto a front surface of a reflective display panel at a PWM frequency to generate visible light having a brightness level.

At step 904, the light sensor 442 samples a mixture of ambient light 102 and emitted light 208 from the illuminator 410 (e.g., as is shown in FIG. 4) during a first sampling period to determine a first light intensity level. As was discussed above, the first sampling period may occur exclusively within an individual period of illumination (e.g., during light pulse period 704 or 804 as is shown with sampling periods 711, 712, and 811). At step 906, the light sensor 442 samples only the ambient light 102 (e.g., as is shown in FIG. 3) during a second sampling period to determine a second light intensity level. For example, the second sampling period may occur exclusively within an individual period of illuminator deactivation (e.g., during periods of illuminator deactivation 706 or 806 as is shown with sampling periods sampling periods 714, 813, and 814). At step 908, a processor determines a difference (i.e., subtraction) between the first and second light intensity samples. The calculated difference corresponds to an emitted light intensity level attributed to the emitted light from the illuminator 410.

In one approach, the first and second light intensity samples may be generated within a short period of time (e.g., within 0-10 seconds) such that the system may assume the characteristics (e.g., brightness) of the ambient light 102 remain relatively constant between a first and second light intensity samples. Otherwise, if the ambient light 102 does change significantly between the first and the second light intensity samples, any difference between the ambient light 102 may be mistakenly attributed to the emitted light 208 from the illuminators 410.

At step 910, the method 900 may optionally also include the processor 402 comparing the calculated emitted light intensity level attributed to the emitted light from the illuminator 410 to an expected light intensity level. In one example, the expected light intensity level may have been previously determined during a calibration setup procedure, as discussed above, and may be recalled from memory 432. In such an approach, the expected light intensity level corresponds to a light intensity level that the illuminators 410 may have produced while new (e.g., before degradation with use over time have reduced the light output of the illuminator 410 at a given current) and/or at a particular temperature (e.g., without the degradation effects of heat or cool on the light output of the illuminator 410 at a given current). In one approach, the processor 402 may generate an intensity offset corresponding to the difference between the emitted light intensity level and the expected light intensity level.

At step 912, the processor 402 may adjust the brightness level of the visible light according to the comparison. In one approach, the processor 402 may adjust the brightness level of the visible light from the illuminators 410 according to the intensity offset. For example, if the determined emitted light intensity level is less than the expected light intensity level, then the brightness level of the visible light from the illuminators 410 may be increased. Similarly, if the determined emitted light intensity level is greater than the expected light intensity level, then the brightness level of the visible light from the illuminators 410 may be decreased. The amount of the change in the brightness level may be related to the intensity offset.

Figure 10:
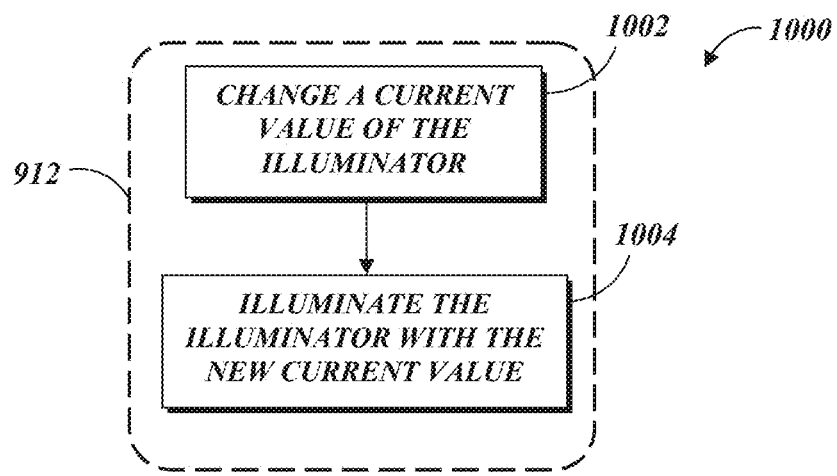
FIG. 10 is flowchart illustrating an exemplary method for changing a brightness level of visible light from an illuminator, according to various embodiments.
Figure 11:
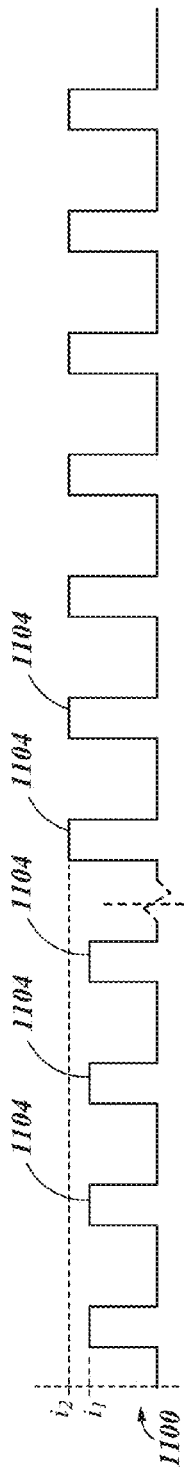
FIG. 11 is another example signal diagram illustrating aspects of various embodiments of the present systems and methods.

FIG. 10 illustrates an example method 1000 of adjusting the brightness level of the visible light from the illuminators 410. The step 912 of adjusting the brightness level of the visible light may further include, at step 1002, changing a first current value with which the illuminator 410 is illuminated during the individual light pulses 704 and 804 to a second current value. For example, if the determined emitted light intensity level is less than the expected light intensity level (possibly due to degradation of the illuminator over time, or variations in temperature), the current provided to the illuminator 410 during the individual light pulses 704 and 804 can be increased (e.g., from 20 mA to 25 mA, or another value) to increase the light intensity output from the illuminators so that they are as bright as they were when initially calibrated. By increasing the current, the display device compensates for the change in performance characteristics of the illuminator 410 (be it due to use over time, temperature, or another factor). At step 1104, the illuminator 410 can be illuminated with the second current value during the light pulses 704 and 804. This concept is illustrated in FIG. 11, which shows an example PWM signal 1100 used to illuminate the illuminators 410. Prior to time 1102, the individual light pulses 1104 are provided with a first current value $i_1$, whereas subsequent to time 1102, the individual light pulses 1104 are provided with a second current value $i_2$ (here shown as an increase). In some embodiments, the PWM duty cycle and/or frequency may remain unchanged with the compensation for illuminator performance being implemented solely by a change in the current provided. The change from the first current value $i_1$ to the increased second current value $i_2$ will result in an increase in light intensity output by the illuminator 410, which subsequently increases the brightness level of the PWM modulated illuminators 410.

Figure 12:
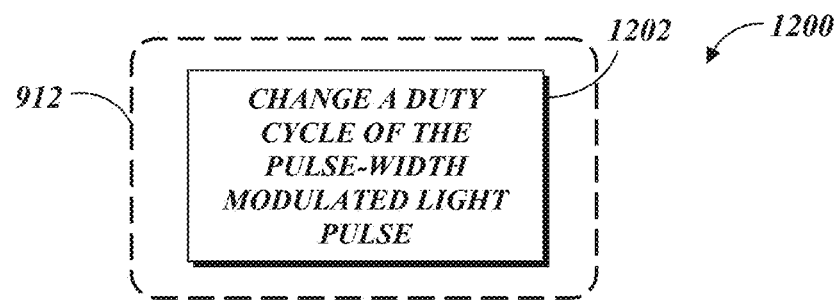
FIG. 12 is another flowchart illustrating an exemplary method of changing a brightness level of visible light from an illuminator, according to various embodiments.
Figure 13:
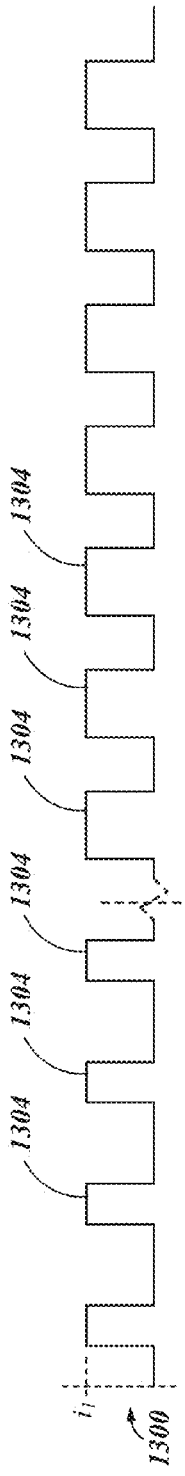
FIG. 13 is another example signal diagram illustrating aspects of various embodiments of the present systems and methods.

FIG. 12 illustrates another example method 1200 of adjusting the brightness level of the visible light from the illuminators 410. The step 912 of adjusting the brightness level of the visible light may alternatively include, at step 1202, changing a duty cycle of the PWM light pulses. For example, if the determined emitted light intensity level is less than the expected light intensity level, the duty cycle of the PWM signal can be increased such that the duty cycle of the light pulses is increased to compensate for the change in performance characteristics of the illuminator 410. This concept is illustrated in FIG. 13, which shows an example PWM signal 1300 used to illuminate the illuminators 410. Prior to time 1302, the individual light pulses 1304 have a first duty cycle, whereas after time 1302, the individual light pulses 1304 have a second duty cycle (here shown as an increase in duty cycle). The increase in duty cycle results in an increase in the brightness level output by the PWM modulated illuminators 410. In some embodiments, the current i/provided to the illuminator 410 and/or the PWM frequency may remain unchanged with the compensation for illuminator performance implemented out solely by a change in the duty cycle. In other embodiments, compensation for illuminator performance by a combination of the above techniques (e.g., a combination of varying the current and/or the duty cycle).

In certain approaches, the technique of altering the brightness level by changing a current provided to an illuminator 410, discussed with respect to FIGS. 10 and 11, may be used in combination with the technique of altering a duty cycle of a PWM signal, discussed with respect to FIGS. 12 and 13. In this approach, the two concepts may be utilized simultaneously to alter a brightness level of the visible light of the illuminator 410. For example, a brightness level of the illuminator 410 can be increased by either or both of increasing the current provided during the individual light pulses and/or increasing the duty cycle of the individual light pulses. In an opposite fashion, the brightness level of the illuminator 410 can be decreased by either or both of decreasing the current provided during the individual light pulses and/or decreasing the duty cycle of the individual light pulses. By changing one or both of the current or duty cycle of the light pulses, other benefits may be realized. For example, if a maximum brightness level is achieved by maximizing the duty cycle (e.g., at 100%), but further visible brightness is desired, the current may also be increased. Similarly, if the current provided to the illuminator 410 during each light pulse is at a maximum current value, the duty cycle may be increased to achieve even further brightness. If a lower brightness level is desired, decreasing the duty cycle to a lower rate (e.g., below 10-20%) may result in a noticeable flickering. To reduce the flickering effect, in another embodiment, instead of further reducing the duty cycle, the current provided to the illuminator may be reduced during each light pulse. In another example, if the current is increased during the individual light pulses while the duty cycle is decreased, or vice versa, the two techniques will have offsetting effects on the brightness level. In particular approaches, a brightness level may appear to be relatively constant if the effects from a change in current value are equally offset by the effects from a change in the duty cycle. The concept of combining the two techniques, as well as one advantage thereof, is further discussed with respect to FIG. 16.

FIG. 14 illustrates an optional method 1400 that may be used with the steps in method 900. As discussed above, at step 1402, an expected light intensity level can be recorded during a calibration setup procedure. In one embodiment, the step 910 of comparing the emitted light intensity level to the expected light intensity level may further include, at step 1404, the processor 402 determining an adjusted emitted light intensity level. The adjusted emitted light intensity level may be based on the light transmission efficiency (LTE) of the display panel 408 at the time the emitted light intensity level was sampled. As discussed elsewhere herein, the LTE corresponds to a content type of the content displayed on the display device. In one approach, the adjusted emitted light intensity level may be the measured emitted light intensity level divided or multiplied by the LTE.

At step 1406, the processor 402 may compare the adjusted emitted light intensity level to an expected light intensity level. The expected light intensity level may similarly correspond to the LTE of the display panel 408. For example, the expected light intensity level may be the previously recorded expected light intensity level divided or multiplied by the same LTE value. The division or multiplication may occur in real time, or may be previously completed and stored, for example, in a lookup table corresponding to a plurality of discrete LTE levels. Alternatively still, during the calibration setup procedure, as in step 1402, a plurality of calibration readings may have been made with different calibration images having various LTE levels being displayed on the display panel 408 to generate a plurality of calibrated LTE-adjusted expected light intensity levels, which may be stored and recalled in a lookup table or the like. The result of the comparison between the adjusted emitted light intensity level and the expected light intensity level can be used in a similar, if not identical, method as step 912 to adjust the brightness level of the visible light on the display panel 408.

Returning briefly to FIGS. 7 and 8, in various embodiments, the sampling frequency at which the light intensity samples are generated, for example, as is indicated by the light sensor sampling activity signal 708 and 808, is asynchronous from the PWM frequency of the PWM signal 702 and 802. In one approach, making the sampling frequency asynchronous from and the PWM frequency may simplify the implementation of the hardware circuitry and/or software that operate the PWM illumination and/or the light sensor sampling, thereby reducing system complexity and cost. For example, in some system architectures, to effect a synchronous implementation, additional electronic hardware or circuitry may be required to enable such synchronization. Similarly, communication and integration across multiple different modules may be required, thereby increasing the complexity of the circuitry design, the complexity of the software or firmware, and/or the load on the hardware elements implementing the system. This can lead to an overall increase in the cost and complexity of the device. In other embodiments, the sampling frequency may be in sync with or directly related to the PWM frequency.

However, by making the sampling frequency asynchronous from the PWM frequency, generating light intensity samples that exclusively measure ambient light 102 or exclusively measure the mixture of ambient light 102 and emitted light 208 may be subject to random chance. As is shown in FIGS. 7 and 8, the PWM frequency (frequency of PWM signal 702 and 802) is asynchronous from the sampling frequency (frequency of light sensor sampling activity signal 708 and 808). The instances of a light intensity sample occurring exclusively during a light pulse 704 or 804 or exclusively during a period of illuminator deactivation 706 or 806 are randomly occurring. In one embodiment, to determine whether a sampling period occurred exclusively within a light pulse 704 or 804 or a period of illuminator deactivation 706 or 806, the processor may examine a set or plurality of light intensity samples over a period of time to find the lowest light intensity value and the highest light intensity value.

The highest light intensity value will occur when a sampling period samples the highest possible light level throughout the sampling period. Thus, the highest light intensity value indicates that its associated sampling period occurred exclusively during a light pulse 704 or 804. Similarly, the lowest light intensity value will occur when a sampling period samples the lowest possible light level throughout the sampling period. Thus, the lowest light intensity value indicates that its associated sampling period occurred exclusively during a period of illuminator deactivation 706 or 806. Any other light intensity value that is between the highest value and the lowest values indicates that its associated sampling period occurred during a transition between a light pulse 704 and a period of illuminator deactivation 706, and is therefore not useful for the purposes of determining the emitted light intensity level.

Figure 15:
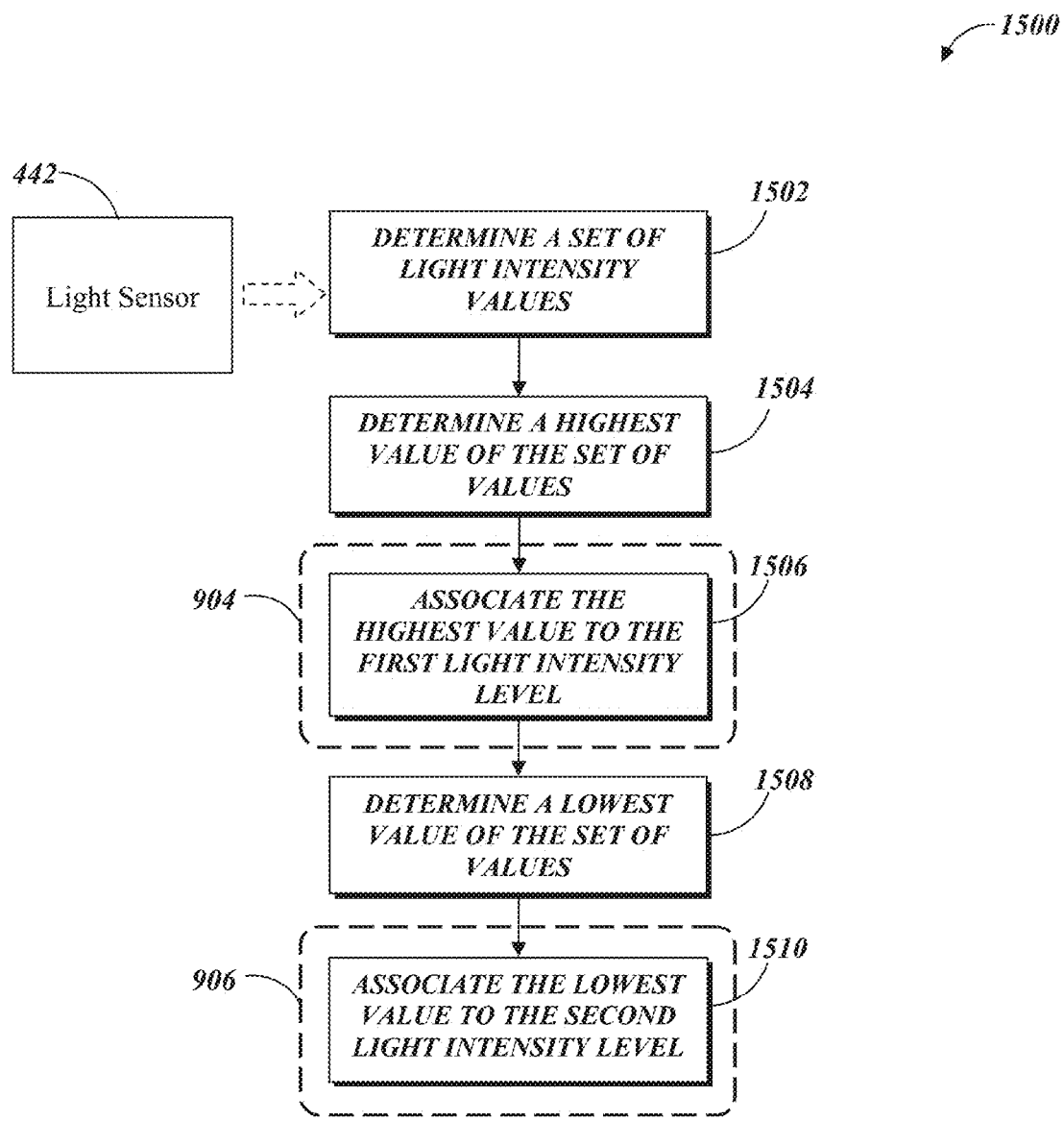
FIG. 15 is another flowchart illustrating an exemplary method of determining an emitted light intensity level attributed to the illuminator, according to various embodiments.

FIG. 15 illustrates a method 1500 performed by the device 400, or another device such as the devices 100, 300 described herein, wherein the processor 402 may be configured to perform various portions of the method 1500. The method 1500 may be implemented as part of or in addition to method 900 of FIG. 9, and may be a method for determining first and second light intensity samples. At step 1502, the light sensor 442 may determine a set of light intensity values sampled over a time period. As mentioned above, the set of light intensity values may be generated at a sampling frequency that is asynchronous from (or synchronous with) the PWM frequency.

At step 1504, the processor may determine a highest light intensity value of the set of light intensity values. At optional step 1506, which may correspond to step 904 in FIG. 9, the processor may associate (e.g., assign) the highest light intensity value with the first light intensity level. At step 1508, the processor may determine a lowest light intensity value of the set of light intensity values. At optional step 1510, which may correspond to step 906 in FIG. 9, the processor may associate (e.g., assign) the lowest light intensity value with the second light intensity level.

In one embodiment, the processor 402 may store the set of light intensity values in a location in memory 432 as they are generated, for example in a first-in-first-out (FIFO) stack that is updated with the most recent intensity samples. The stack may save the previous 100 samples (or some other number of previous samples). During steps 1504 and 1508, the processor may search the stack to find the light intensity values with the highest and lowest values. The highest light intensity sample corresponds to a sampling period that occurred exclusively during a light pulse 704 or 804, while the lowest light intensity sample corresponds to a sampling period that occurred exclusively during a period of illuminator deactivation 706 or 806.

Alternatively, the processor 402 may save the lowest and highest values of the light intensity samples that are then compared to other incoming light intensity samples to see if the incoming samples are higher or lower. If the new sample value is lower than the presently saved lowest light intensity sample, then the saved lowest light intensity sample is updated with the newest sample. If the new sample value is higher than the presently saved highest light intensity sample, then the saved highest light intensity sample is updated with the newest sample. An age of the presently saved highest or lowest samples (e.g., in time and/or sampling periods) may be saved and/or updated over time. After a set of samples has been generated (e.g., 100 samples) and the high/low comparisons performed, the processor 402 will know the highest and lowest values.

The sampling may occur continuously (e.g., a sample occurring continuously every 100 ms), may occur in bursts (e.g., taking a burst of 100 samples, the burst occurring once every minute or ever few minutes), or may occur during a content change (e.g., page change or page turn event) on the display device. The number of required samples (e.g., captured in a burst of samples) may be dependent upon the frequency of sampling, the sampling period (e.g., integration time) of the light sensor 442, or another factor. For example, a shorter sampling period will typically require a smaller collection of samples to find the highest and lowest light intensity values. In one embodiment, 100 samples may collected in a bust of samples, however, other amounts of samples may be collected in various application settings.

In another approach, given a steady sampling frequency and steady light pulse frequency, an aliasing effect may occur within the sample sets. In one example, the measured light intensity values of the set of samples may increase and decrease in a sinusoidal (or similar) pattern. In one embodiment, the processor 402 can recognize the increasing and decreasing pattern, and the processor 402 can stop collecting samples. The processor can then determine if it has already received a highest or lowest light intensity value sample. Similarly, the processor can extrapolate the sinusoidal pattern from the smaller collection of samples to determine the highest and lowest light intensity values.

With the knowledge of the highest light intensity value (e.g., as the first light intensity level) and the lowest light intensity value (e.g., as the second light intensity value), the processor 402 can perform step 908 to determine a difference between the highest light intensity value and the lowest light intensity value. The difference corresponds to the emitted light intensity value attributed to the individual light pulses 704 and 804 from the illuminator 410.

In various approaches, the device 400 may alter or vary the duty cycle of the PWM signal to ensure that the light sensor captures light both types of required light intensity samples (e.g., wherein the sampling period occurs exclusively during the light pulse 704 or 804, and wherein the sampling period occurs exclusively during a period of illuminator deactivation 706 or 806). For example, if the duty cycle is too high, then the period of illuminator deactivation 706 or 806 may become too short (e.g., shorter than the sampling period) such that it is impossible or improbable that a light intensity sample may be generated for only ambient light 102. Similarly, if the duty cycle is too low, then the light pulses 704 or 804 may become too short (e.g., shorter than the sampling period) such that it is impossible or improbable that a light intensity sample may be generated exclusively during the light pulse 704 or 804 to capture the light intensity of the combination.

To accommodate alterations of the PWM duty cycle with little to no interference with a user's enjoyment of the device (e.g., without a perceptible or otherwise undesired change in the perceived brightness level, e.g., flashing or dimming), the processor may vary the duty cycle of the PWM signal during a page refresh or page turn event to ensure one or multiple samples are properly captured. For example, if the display is operating with a higher brightness level (e.g., with a high duty cycle), then the light sensor 442 will easily be able to sample exclusively during a light pulse 704 or 804. However, the light sensor 442 will have less of a likelihood, or even an impossibility, of capturing a sample during a period of illuminator deactivation 706 or 806. In one approach, the duty cycle (and brightness level) can be greatly reduced for a short period of time during a page refresh to enable the light sensor 442 to capture a light intensity sample during a period of illuminator deactivation 706 or 806. Similarly, for example, if the display is operating with a lower brightness level (e.g., with a low duty cycle), then the duty cycle (and brightness level) can be greatly increased for a short period of time during a page refresh to enable the light sensor 442 to capture a light intensity sample exclusively during a light pulse 704 or 804 (an increase in duty cycle is illustrated in FIG. 13, which may appear in a similar manner as just described above). Such temporary changes in PWM duty cycle can occur during other events, or even randomly, and may often be too quick to perceive by the average user.

Figure 16:
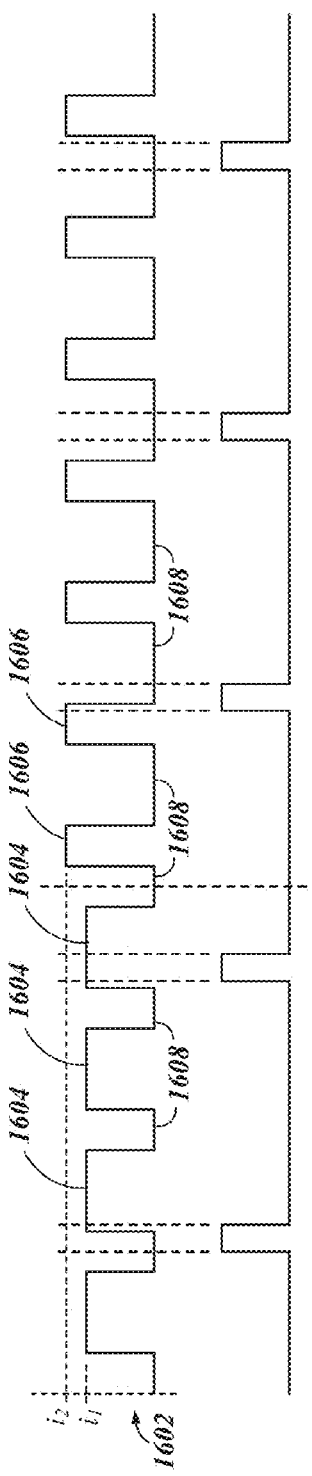
FIG. 16 is another example signal diagram illustrating aspects of various embodiments of the present systems and methods.

In another approach, as is shown in FIG. 16, a temporary change in duty cycle can be accompanied by a temporary increase or decrease in current provided to the illuminator 410. The brightness level perceived by a user is dependent upon both the duty cycle of the PWM signal 1602 as well as the brightness of the individual light pulses 1604 or 1606. The brightness of the individual light pulses is determined, in part, by the current through the illuminator during the light pulses. If at time 1610, the duty cycle is reduced while the current for each individual light pulse is increased, for example, from $i$/to $i_2$, then a user may not perceive any change in the brightness level of the display, or may perceive only a slight variation in brightness or a flickering. Such an arrangement utilizing both high and low duty cycle PWM signals may present an opportunity to capture a light intensity level during a light pulse 1604 before time 1610, while quickly presenting an opportunity to capture a light intensity level during a longer period of illuminator deactivation 1608. An opposite transition may be utilized as well (e.g., a transition from a lower duty cycle to a higher duty cycle to increase the opportunity to capture a sample during a light pulse). However, the effects of performance variations of an illuminator 442 may be less and less perceivable to a user when the visible light level is lower (e.g., during lower duty cycle usage).

Figure 17:
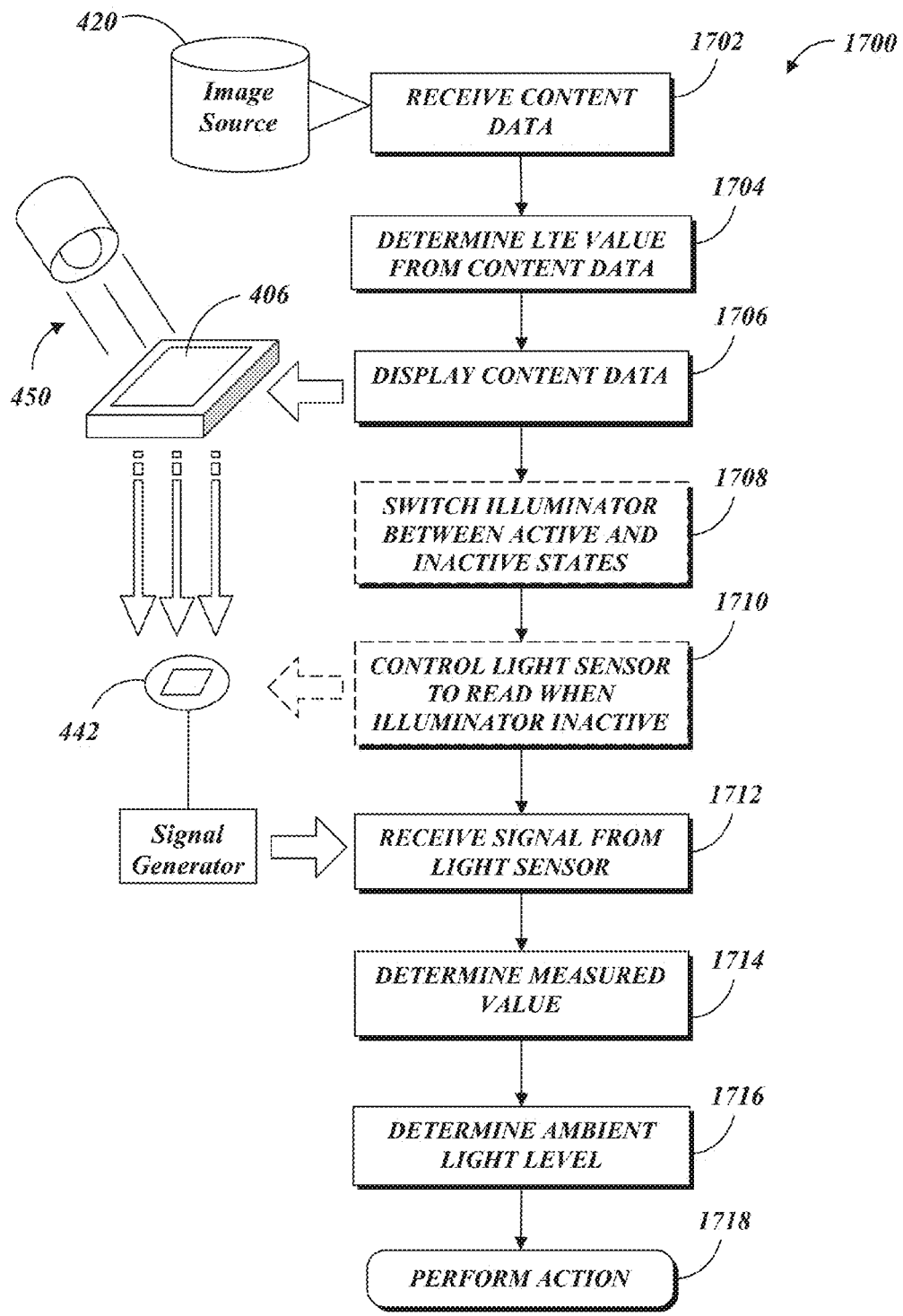
FIG. 17 is a flowchart illustrating an exemplary method of determining an ambient light level of ambient light incident on a device, according to various embodiments.

Turning now to other aspects of the present disclosure, FIG. 17 illustrates an exemplary method 1700 performed by the device 400, or another device such as the devices 100, 300 described herein, for adapting display properties of the device 400 to account for the intensity of ambient light incident on the device 400. At step 1702, the processor 402 may receive content data to be rendered to the display panel, and at step 1704 the processor 402 may determine, from the content data, an LTE value of the device 400. The LTE value represents a percentage of the ambient light and/or the emitted light that is expected to be received by a light sensor of the device 400 when the content is displayed on the display panel 408 (i.e., when the content data is rendered to the display panel), as described above with respect to FIGS. 2-4. Various approaches to determining the LTE value based on the content data are described below, particularly with respect to FIGS. 19-24.

At step 1706, the processor 402 may display the content on the display panel 408. While displaying the content, the display panel 408 reflects a portion (i.e., the received portion 222 of FIG. 3) of the ambient light incident on the display panel 408 to the light sensor 442 through the light guide panel 409. The light sensor 442 may detect and measure the received portion 222, which may include converting the measurement to a digital measured value representing the intensity of light detected by the light sensor 442. The light sensor 442 may generate a signal that includes the measured value. In an optional step 1708, after displaying the content the processor 402 may switch the one or more illuminators (e.g., front light 410) on and off (i.e., between active and inactive states) to provide the desired brightness level (e.g., the frontlight level) to the display panel 408. At optional step 1710, the processor 402 may control the light sensor 442, such as by sending an instruction to the light sensor 442, to detect and measure the received portion during the inactive state of the illuminators. This may avoid incidence on the light sensor 442 of stray light emitted by the illuminators 410, which can disrupt the ambient light measurement. It is contemplated, however, that some embodiments may allow measurement of the received portion while the illuminators are emitting light, with subsequent steps determining whether any measured light originated from the illuminators 410 and removing such light from the signal.

At step 1712, the processor 402 may receive the signal generated by the light sensor 442, and at step 1714, the processor 402 may determine the measured value from the signal. At step 1716, the processor 402 may determine the ambient light level of the ambient light 102, wherein the measured value corresponds to the LTE value and, thus, to the first percentage of the ambient light level. At step 1718, the processor 402 may perform an action associated with the ambient light level, i.e., the action requiring the ambient light level. Exemplary actions are described above, and include controlling a LED or other illuminator of the device to emit LED light through the light guide panel onto the front side of the display panel at a frontlight level associated with the ambient light level.

In some implementations, the LTE value may be determined from a content type of the content. The content may be one or a combination of a plurality of content types, which may depend on the type of device 400 and the type of display panel. For example, e-readers and monochromatic displays may be limited to displaying content that is either all text or one or more graphics perhaps combined with text (i.e., not all text). More graphically powerful displays may present video, composite screens, overlays, and other content types. Some of the content types may be characterizable in a manner that allows one or more standard LTE values to be derived and stored as a usable approximation for some or all content of the content type. For example, on an e-reader, a page of text has on average about 10% black display pixels, and the rest of the display pixels are white; content of the text content type is thus very conducive to a standard or "default" LTE value for all text. On the other hand, content including graphics, whether monochrome, grayscale, or color, may not create any consistent distribution of display pixel brightnesses. Thus, in some embodiments, the device 400 may store and apply a default LTE value for any content determined to be all text, and may compute the LTE value for content of other content types in real-time.

Figure 18:
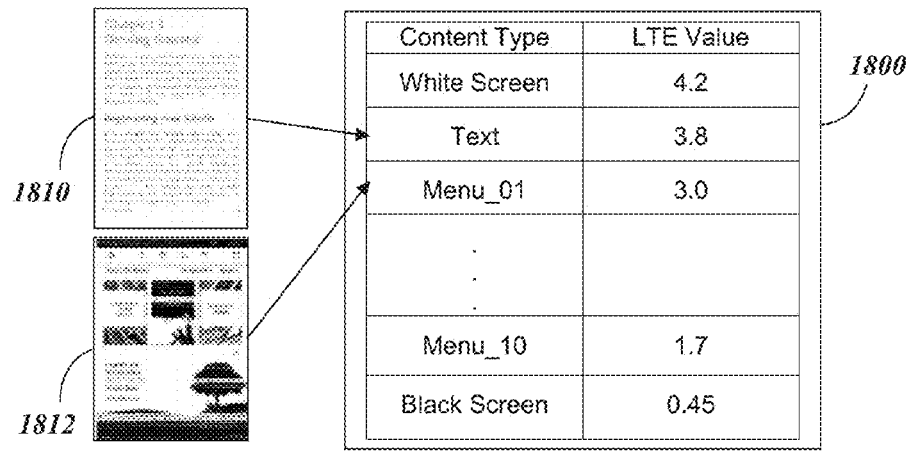
FIG. 18 is a diagram of an exemplary content type lookup table, according to various embodiments.
Figure 19:
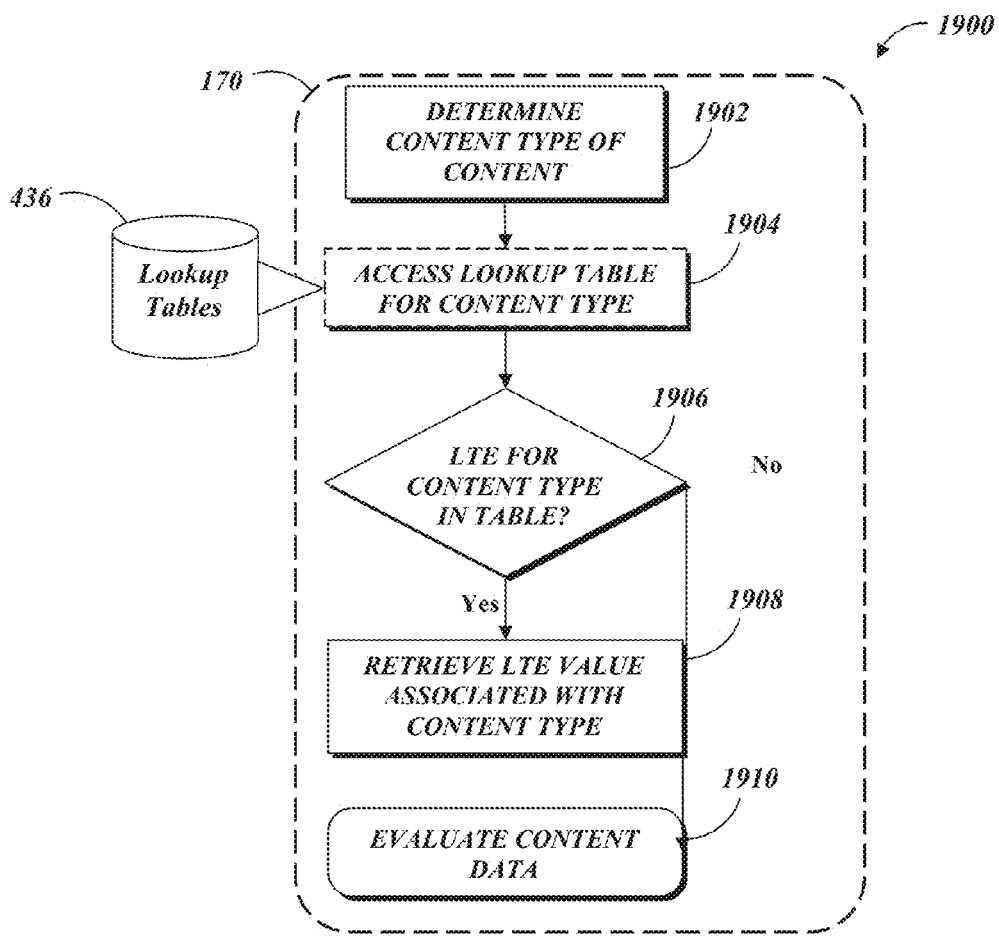
FIG. 19 is a flowchart illustrating an exemplary method of determining a light transmission efficiency value, according to various embodiments.

Referring to FIG. 18, in some embodiments, content types other than text 1810 may be characterizable, including certain identifiable individual instances of content. For example, a device 400 that frequently reuses a menu 1812, a loading screen, an interface, and the like, may calculate (or receive) and store a default LTE value for that particular composition of graphics and/or text. A content type lookup table 1800 may be populated with the characterizable content types and their associated standard LTE values. The content type lookup table 1800 may be stored in memory (e.g., with lookup tables 436 of FIG. 6). Referring to FIG. 19, a method 1900 of determining the LTE value (as in exemplary step 1704) may include, at step 1902, determining the content type of the content, using pixel data or an identifier of the content, or another suitable approach. At step 1904, the processor 402 may access memory to retrieve or search the content type lookup table 1800, using the content type of the content as the lookup value. In some embodiments, the content type may be the identifier of a particular screen content, e.g., a first menu 1812. For example, the first menu 1812 may be associated with a file name or other identifier that the processor 402 receives when the first menu 1812 is to be displayed; the processor 402 may use the file name as the lookup value to retrieve the corresponding LTE value from the content type lookup table 1800. In other embodiments, the processor 402 may determine that the content type is not in the content type lookup table 1800 without accessing the content type lookup table 1800. For example, the processor 402 may determine that the content is not text or a menu and is therefore the image content type, and may skip accessing the lookup table 1800.

Figure 20:
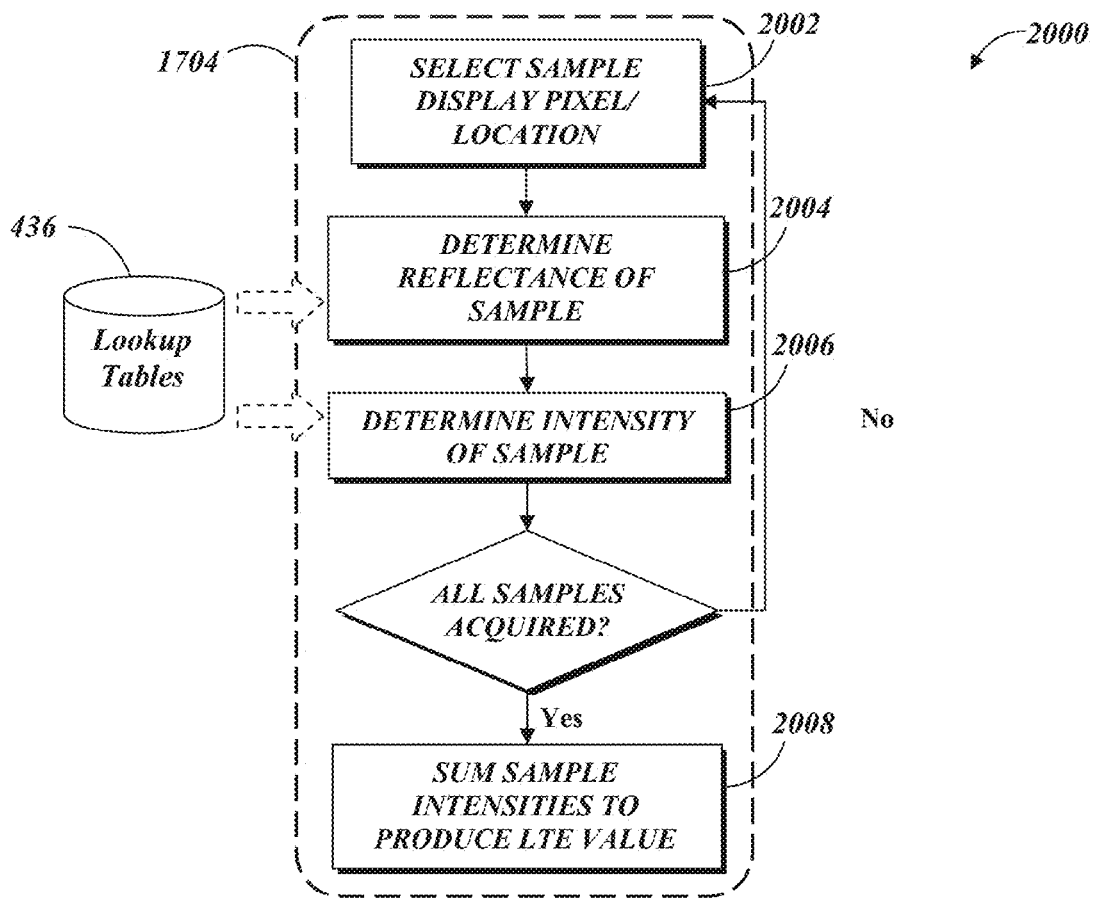
FIG. 20 is a flowchart illustrating another exemplary method of determining a light transmission efficiency value, according to various embodiments.

At step 1906, the processor 402 may determine whether the content type lookup table 1800 includes an LTE value for the relevant content type. If so, at step 1908 the processor 402 may retrieve the LTE value associated with the content type. If not, at step 1910 the processor 402 may determine that an evaluation of the content, such as with the sampling method 2000 of FIG. 20, is needed to determine the LTE value.

In some implementations, the LTE value may be determined (as in exemplary step 1704) by evaluating a plurality of samples at various locations of the display panel 408 while the display panel 408 is displaying the content (or, more specifically, while the display of the content is emulated by the processor 402). Any suitable methodology may be used to select the sample locations in order to obtain a desirably comprehensive sample size, which may depend on the size, pixel pitch, and/or pixel resolution of the display panel. Referring to FIG. 20, in one method 2000 of sampling, the processor 402 may, at step 2002, select a sample location, which may be a point, area, or region on the display panel 408, a display pixel or a pixel of the content data. At step 2004, the processor 402 may determine the reflectance percentage exhibited by the sample location during display of the content. As stated above, the reflectance percentage is the percentage of the ambient light incident on the sample location that is reflected by the sample location and couples into the light guide panel. In one embodiment, the processor 402 may identify a reflectance value that is associated with a brightness value (from the content data) and/or a brightness of the sample location, the reflectance value representing the corresponding reflectance percentage.

At step 2006, the processor 402 may determine an intensity value of the sample location. The intensity value may represent the percentage of the ambient light and/or the emitted light intensity level incident on the sample location that is actually received by the light sensor. In one embodiment, the processor 402 may modify the reflectance value to represent a reflectance percentage that is based relatively on where in the display panel the sample location is located; exemplary methods are discussed below with respect to FIGS. 21 and 22. The processor 402 may then repeat steps 2002-2006 with at least one additional sample location. Once all of the sample locations have been acquired and evaluated, the processor 402 may calculate, as the LTE value, a sum or an average of the intensity values of the sample locations, at step 2008.

Figure 21:
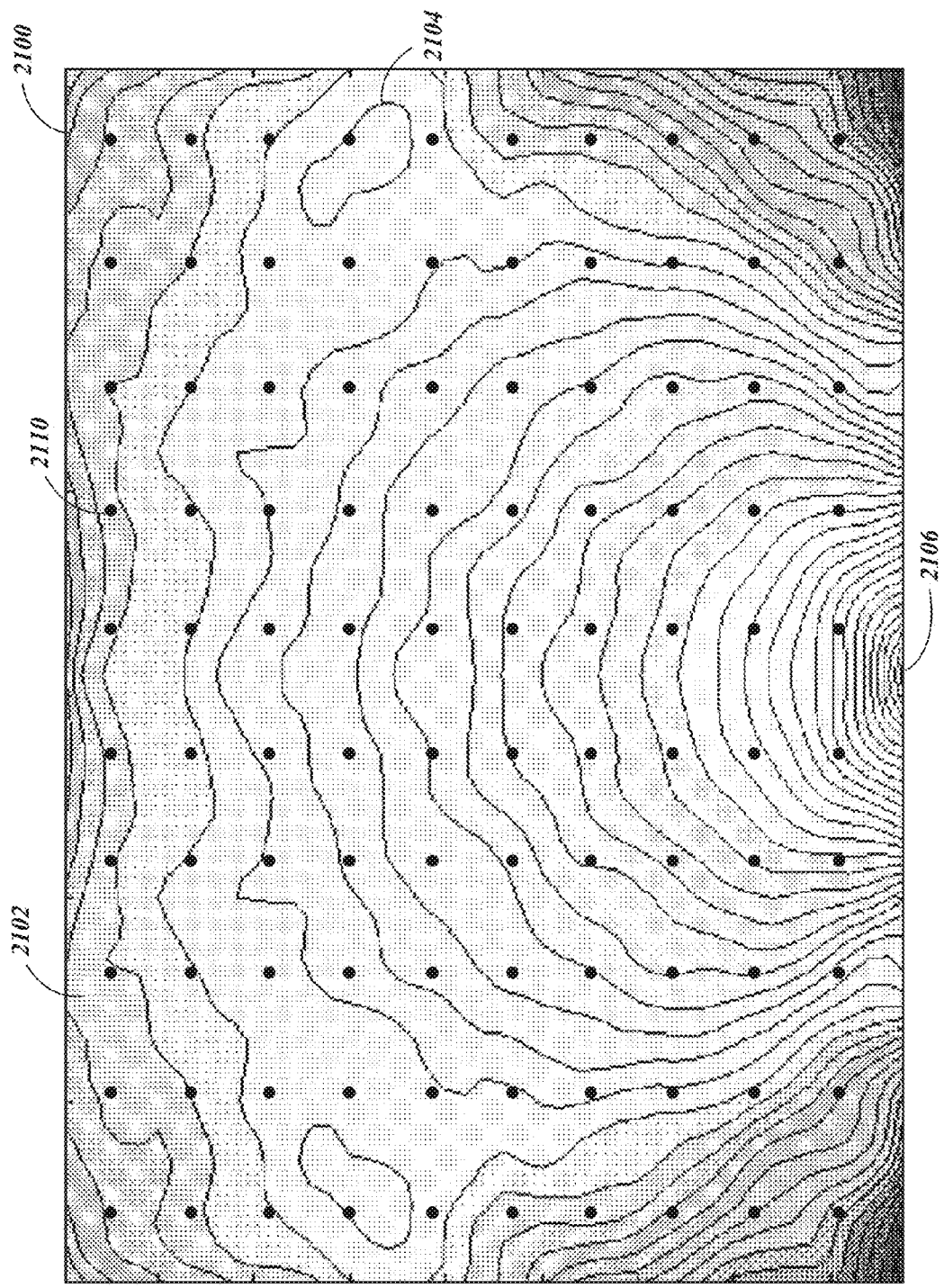
FIG. 21 is a diagram of an intensity map, according to various embodiments.

Referring to FIG. 21, another approach to determining the intensity value of each sample location (as in step 2006) is to use an intensity map 2100. The intensity map 2100 may represent the front surface of the display panel; that is, the corners of the intensity map 2100 may correspond to the corners of the viewable screen, and each point on the intensity map 2100 may correspond to a location on the display panel. The intensity map 2100 may be divided into a plurality of zones 2102 by corresponding borders 2104. The zones 2102 may be oriented in any suitable manner with respect to a feature of the display panel, a feature of the intensity map 2100, and/or the other zones 2102. In one embodiment, the zones 2102 may be arranged radially outward from an origin 2106, which is a point representing a position of the light sensor with respect to the display panel. Each zone 2102 may be associated with a corresponding coefficient that represents a decay of light that originates in the corresponding zone (i.e., reflected light) and is received by the light sensor, the decay based on distance (and, in some embodiments, direction) from the light sensor as described above. The intensity map 2100 and/or the coefficients and their associations with the zones 2102 may be stored in memory as the intensity map data 438.

Figure 22:
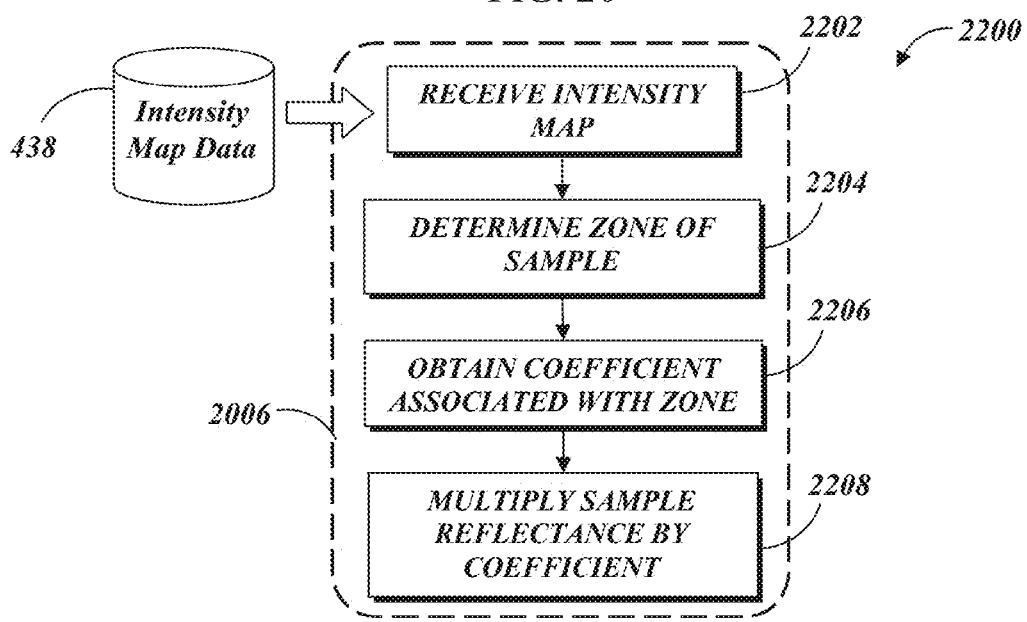
FIG. 22 is a flowchart illustrating another exemplary method of determining an intensity value for a location on a display panel, according to various embodiments.

FIG. 22 illustrates an exemplary method 2200 for using an intensity map 2100 to determine the intensity value of a sample location, such as one of the 100 exemplary sample locations 2110 of FIG. 9, which may represent points, areas, regions, display pixels, and the like, on the display panel 408. It will be understood that an intensity map 2100 may be used in other measurement processes, such as in the method 2300 of evaluating all of the pixels in the content data, illustrated in FIG. 23. At step 2202, the processor 402 may receive the intensity map, and at step 2204, the processor 402 may determine, on the intensity map, which zone contains the sample location being evaluated. For example, the processor 402 may determine that the sample location corresponds to a point on the map that is within a first zone of the plurality of zones. At step 2006, the processor 402 may obtain from the intensity map, or from the intensity map data, the coefficient associated with the identified zone, and at step 2008, the processor 402 may multiply the reflectance value at the sample location by the obtained coefficient to produce the corresponding intensity value.

Figure 23:
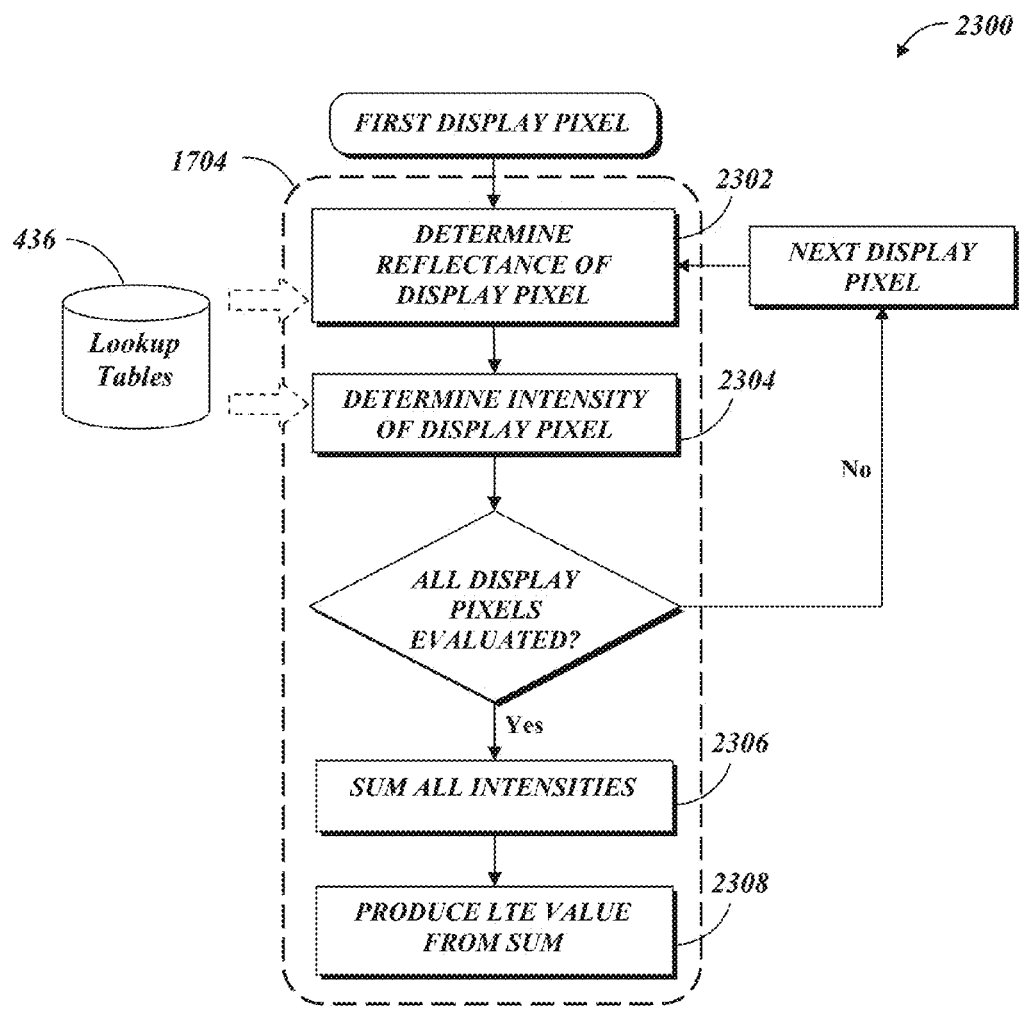
FIG. 23 is a flowchart illustrating another exemplary method of determining a light transmission efficiency value, according to various embodiments.

In some implementations, the LTE value may be determined (as in exemplary step 1704 of FIG. 17) on a display panel 408 having display pixels or other discrete regions by evaluating all of the display pixels in the display panel 408 while the display panel 408 is displaying the content (or, more specifically, while the display of the content is emulated by the processor 402) to produce an intensity value for each display pixel. While this is the most computationally expensive approach of those described herein, it may also be the most accurate. Referring to FIG. 23, the method 2300 may begin with a first display pixel. The processor 402 may, at step 2302, determine the reflectance value representing the reflectance percentage exhibited by the display pixel during display of the content. As stated above, the reflectance value represents the percentage of the ambient light incident on the sample location and/or the emitted light from the illuminator 410 incident on the sample location that is reflected by the sample location and couples into the light guide panel. In one embodiment, the processor 402 may determine, from a brightness value of the display pixel, that during display by the display panel of the content, a corresponding second percentage of the ambient light and/or emitted light incident on the display pixel is reflected by the display pixel and couples into the light guide panel.

At step 2304, the processor 402 may determine an intensity value of the sample location. The intensity value may represent the percentage of the ambient light and/or emitted light incident on the sample location that is actually received by the light sensor. In various embodiments, the processor 402 may use any of the exemplary methods of determining the intensity value discussed herein, such as those discussed with respect to FIGS. 21 and 22. The processor 402 may then repeat steps 2302 and 2304 for each of the display pixels. Once all of the display pixels have been evaluated, the processor 402 may, at step 2306 compute a sum of all of the intensity values and, at step 2308, store the sum as the LTE value.

Figure 24:
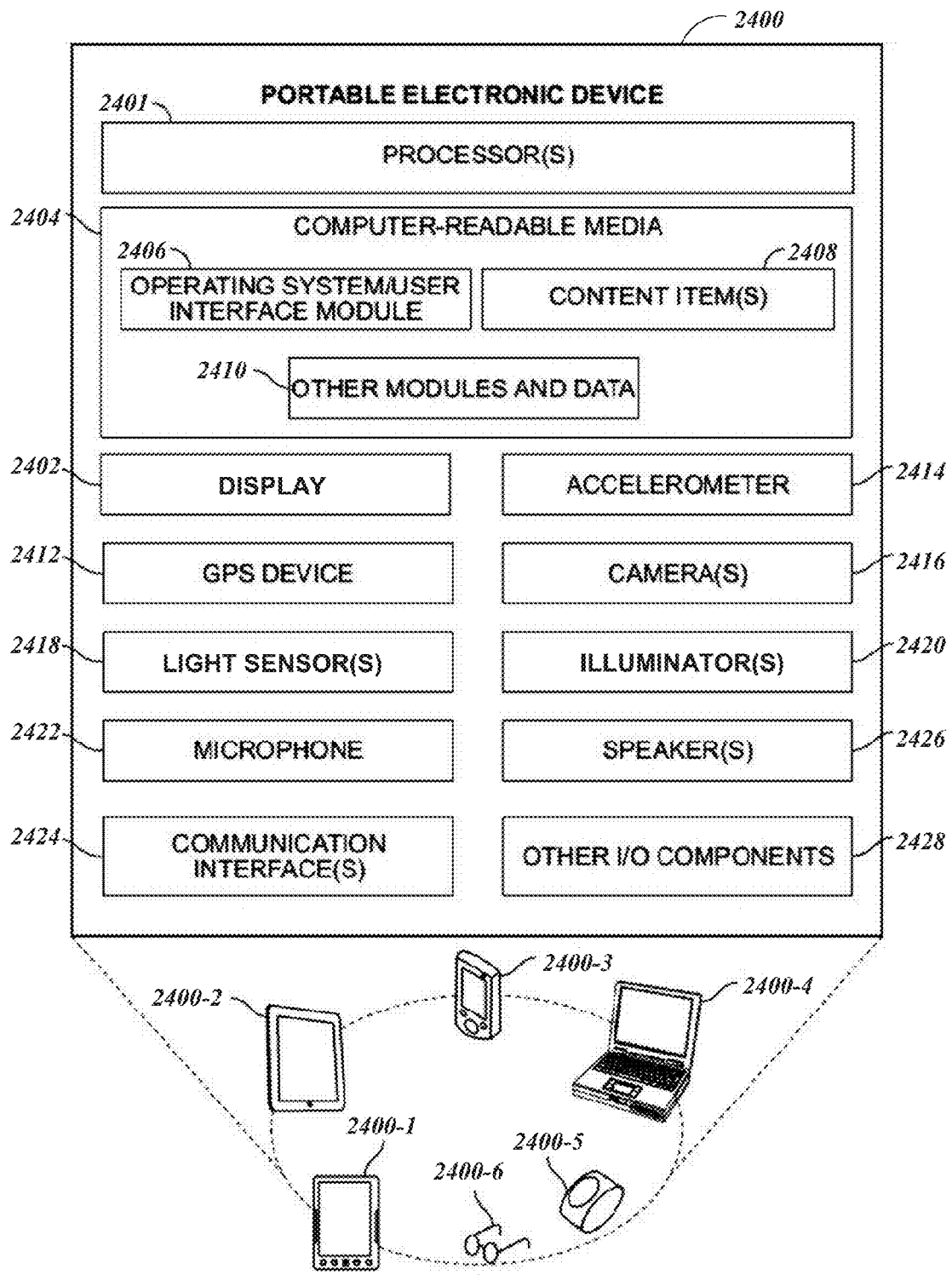
FIG. 24 is a system diagram illustrating select components of an example computing device that may implement the present ambient light measurement processes, as described in various embodiments.

FIG. 24 illustrates select example components of an example computing device 2400 (which may correspond to computing devices 100, 300, and/or 400 described above) that may be used with a display 2402 that can be optimized for viewing and other conditions using the ambient light measurement methods described herein. Such types of displays 2402 include, but are not limited to, LCDs, cholesteric displays, electrophoretic displays, electrofluidic pixel displays, photonic ink displays, and the like.

The computing device 2400 may be implemented as any of a number of different types of electronic devices. Some examples of the computing device 2400 may include digital media devices and eBook readers 2400-1; tablet computing devices 2400-2; smart phones, mobile devices and portable gaming systems 2400-3; laptop and netbook computing devices 2400-4; wearable computing devices 2400-5; augmented reality devices, helmets, goggles or glasses 2400-6; and any other device capable of incorporating or connecting to the display 2402 and including a processor and memory for controlling the display 2402 according to the techniques described herein.

In a very basic configuration, the computing device 2400 includes, or accesses, components such as at least one control logic circuit, central processing unit, or processor 2401 (e.g., any processor 402 or graphics processor 404 or a similar processor), and one or more computer-readable media 2404. Each processor 2401 may itself comprise one or more processors or processing cores. For example, the processor 2401 can be implemented as one or more microprocessors, microcomputers, microcontrollers, digital signal processors, central processing units, state machines, logic circuitries, and/or any devices that manipulate signals based on operational instructions. In some cases, the processor 2401 may be one or more hardware processors and/or logic circuits of any suitable type specifically programmed or configured to execute the algorithms and processes described herein. The processor 2401 can be configured to fetch and execute computer-readable instructions stored in the computer-readable media 2404 or other computer-readable media. The processor 2401 can perform one or more of the functions attributed to other processing components of the computing device 2400 (e.g., the processor 402, the graphics processor 404, or the timing control interface 412, column driver 414, or row driver 416 of the display 406).

Depending on the configuration of the computing device 2400, the computer-readable media 2404 may be an example of tangible non-transitory computer storage media and may include volatile and nonvolatile memory and/or removable and non-removable media implemented in any type of technology for storage of information such as computer-readable instructions, data structures, program modules or other data. The computer-readable media 2404 may include, but is not limited to, RAM, ROM, EEPROM, flash memory or other computer readable media technology, CD-ROM, digital versatile disks (DVD) or other optical storage, magnetic cassettes, magnetic tape, solid-state storage and/or magnetic disk storage. Further, in some cases, the computing device 2400 may access external storage, such as RAID storage systems, storage arrays, network attached storage, storage area networks, cloud storage, or any other medium that can be used to store information and that can be accessed by the processor 2401 directly or through another computing device or network. Accordingly, the computer-readable media 2404 may be computer storage media able to store instructions, modules or components that may be executed by the processor 2401.

The computer-readable media 2404 may be used to store and maintain any number of functional components that are executable by the processor 2401. In some implementations, these functional components comprise instructions or programs that are executable by the processor 2401 and that, when executed, implement operational logic for performing the actions attributed above to the computing device 2400. Functional components of the computing device 2400 stored in the computer-readable media 2404 may include the operating system and user interface module 2406 for controlling and managing various functions of the computing device 2400, and for generating one or more user interfaces presented to a viewer on the display 2402.

In addition, the computer-readable media 2404 may also store data, data structures and the like, that are used by the functional components. For example, data stored by the computer-readable media 2404 may include user information and, optionally, one or more content items 2408. Depending on the type of the computing device 2400, the computer-readable media 2404 may also optionally include other functional components and data, such as other modules and data 2410, which may include programs, drivers and so forth, and the data used by the functional components. Further, the computing device 2400 may include many other logical, programmatic and physical components, of which those described are merely examples that are related to the discussion herein. Further, while the figures illustrate the functional components and data of the computing device 2400 as being present on the computing device 2400 and executed by the processor 2401 on the computing device 2400, it is to be appreciated that these components and/or data may be distributed across different computing devices and locations in any manner.

FIG. 24 further illustrates examples of other components that may be included in the computing device 2400. Such examples include various types of sensors, which may include a GPS device 2412, an accelerometer 2414, one or more cameras 2416, one or more light sensors 2418 (as described herein), one or more illuminators 2420 (as described herein), a microphone 2422, and so forth.

The computing device 2400 may further include one or more communication interfaces 2424, which may support both wired and wireless connection to various networks, such as cellular networks, radio, Wi-Fi networks, close-range wireless connections, near-field connections, infrared signals, local area networks, wide area networks, the Internet, and so forth. The communication interfaces 2424 may further allow a user to access storage on or through another device, such as a remote computing device, a network attached storage device, cloud storage, or the like.

The computing device 2400 may further be equipped with one or more speakers 2426 and various other input/output (I/O) components 2428. Such I/O components 2428 may include a touchscreen and various user controls (e.g., buttons, a joystick, a keyboard, a keypad, etc.), a haptic or tactile output device, connection ports, physical condition sensors, and so forth. For example, the operating system 2406 of the computing device 2400 may include suitable drivers configured to accept input from a keypad, keyboard, or other user controls and devices included as the I/O components 2428. Additionally, the computing device 2400 may include various other components that are not shown, examples of which include removable storage, a power source, such as a battery and power control unit, a PC Card component, and so forth.

In accordance with various embodiments disclosed herein, a method of compensating for performance variations of an illuminator of a reflective display device includes emitting, with an illuminator, a pulse-width modulated (PWM) series of light pulses onto a front surface of a reflective display panel at a PWM frequency to generate a visible light having a first brightness level. The method also includes generating, using a light sensor, a series of light intensity level samples at a sampling frequency asynchronous from the PWM frequency. The method further includes, determining, by a processor, a highest light intensity value of the series of light intensity level samples, the highest light intensity value corresponding to the presence of an ambient light and an emitted light from the illuminator during an entirety of a first sampling period, and determining, by the processor, a lowest light intensity value of the series of light intensity level samples, the lowest light intensity value corresponding to the ambient light in the absence of emitted light from the illuminator during an entirety of a second sampling period. The method also includes the processor determining a difference between the highest light intensity level and the lowest light intensity level, the difference corresponding to an emitted light intensity level attributed to individual light pulses from the illuminator, comparing the emitted light intensity level to an expected emitted light intensity level to generate an intensity offset, and adjusting the first brightness level of the visible light according to the intensity offset.

In certain approaches, adjusting the first brightness level of the visible light further comprises changing a current value provided to the illuminator during the individual light pulses, changing a duty cycle of the PWM series of light pulses, or both. In other approaches, the method further comprises generating the series of light intensity level samples during a page turn event.

In another embodiment, a method includes emitting a series of light pulses with an illuminator, using a first current value, onto a display panel to generate a visible light having a first brightness level, the series of light pulses emitted such that individual periods of illumination by the illuminator are interleaved with individual periods during which the illuminator is turned off. The method further includes sampling, using a light sensor, ambient light and emitted light from the illuminator during a first sampling period to determine a first light intensity level, wherein the first sampling period occurs exclusively within an individual period of illumination. The method also includes sampling, using the light sensor, the ambient light during a second sampling period to determine a second light intensity level, wherein the second sampling period occurs exclusively within an individual period during which the illuminator is turned off. The method also includes determining, by a processor, a difference between the first light intensity level and the second light intensity level, the difference corresponding to an emitted light intensity level attributed to the illuminator.

In various embodiments, the method also includes the processor comparing the emitted light intensity level to an expected light intensity level and adjusting the first brightness level of the visible light according to the comparison. In other embodiments, adjusting the first brightness level further comprises changing the first current value to a second current value and illuminating the illuminator with the second current value during subsequent periods of illumination. In other embodiments, the method includes outputting the series of light pulses in a pulse-width modulation (PWM) scheme, and adjusting the first brightness level of the visible light further comprises changing a duty cycle of the light pulses.

In other embodiments, the method also includes the light sensor determining a set of light intensity values over a time period. The method also may include the processor determining a highest value of the set of light intensity values, associating the highest value of the set of light intensity values with the first light intensity level, determining a lowest value of the set of light intensity values, and associating the lowest value of the set of light intensity values with the second light intensity level. The method may further include determining the set of light intensity values at a sampling frequency asynchronous from a frequency of the series of light pulses and/or determining the set of light intensity values during a page turn event.

In other approaches, comparing the emitted light intensity level to the expected light intensity level further includes the processor determining an adjusted emitted light intensity level based on the emitted light intensity level and a light transmission efficiency (LTE), the LTE corresponding to a type of content displayed on the display device, and comparing the adjusted emitted light intensity level to an expected light intensity level corresponding to the LTE.

In accordance with other embodiments, a display device includes a display panel, an illuminator configured to illuminate the display panel at a first brightness level via a series of light pulses comprising a plurality of individual periods of illumination where the illuminator is illuminated by a first current value, interleaved with individual periods during which the illuminator is off, and a light sensor configured to sense ambient light from a surrounding environment and emitted light from the illuminator. The display device also includes a processor communicatively coupled to the illuminator and the light sensor. The processor may be configured to sample, using the light sensor, the ambient light and the emitted light during a first sampling period to determine a first light intensity level, wherein the first sampling period occurs exclusively within an individual period of illumination; sample, using the light sensor, the ambient light during a second sampling period to determine a second light intensity level, wherein the second sampling period occurs exclusively within an individual period during which the illuminator is off; and determine a difference between the first light intensity level and the second light intensity level.

In other embodiments, a difference between the first light intensity level and the second light intensity level corresponds to an emitted light intensity level attributed to the illuminator. The processor may be further configured to compare the emitted light intensity level to an expected light intensity level, and adjust, according to the comparison, the first brightness level at which the illuminator illuminates the display panel.

The processor may be further configured to adjust the first brightness level by changing the first current value to a second current value, and wherein the illuminator is further configured to be illuminated with the second current value during the plurality of individual periods of illumination. In some embodiments of the display device, the illuminator is configured to illuminate the display panel via a pulse-width modulated (PWM) series of light pulses, and the processor is further configured to adjust the first brightness level by changing a duty cycle of the light pulses.

In accordance with some embodiments, the light sensor is configured to determine a series of light intensity values sampled over a time period. The processor may be configured to determine a highest value of the series of light intensity values, determine the first light intensity level by associating the highest value of the series of light intensity values with the first light intensity level, determine a lowest value of the series of light intensity values, and determine the second light intensity level by associating the lowest value of the series of light intensity values with the second light intensity level. In another embodiment, the processor is further configured to vary a duty cycle of the series of light pulses during the time period.

In another embodiment, the illuminator is further configured to emit the series of light pulses at a first frequency, and the light sensor is further configured to generate the series of light intensity values at a second frequency asynchronous with the first frequency.

In various approaches, the display device also includes a light guide configured to direct the ambient light and the emitted light to the light sensor, and a chassis arranged over the light sensor and configured to isolate the light sensor from direct incident exposure to the ambient light. The display panel may be a reflective display panel and the illuminator may be a front light configured to provide light onto a front side of the reflective display panel.

In other embodiments, a method for adapting display properties of a device to account for an ambient light intensity of ambient light incident on an electrophoretic display (EPD) panel of the device may include receiving content data to be displayed on the EPD panel. The method may also include determining, using the content data, a first light transmission efficiency (LTE) value representing a first percentage of the ambient light intensity, the first percentage being received by a light sensor of the device when the content data is rendered on the EPD panel, and displaying content, corresponding to the content data, on the EPD panel, wherein the EPD panel reflects a portion of the ambient light towards the light sensor through a light guide panel optically coupled to a front surface of the EPD panel. The method may also include determining, using the light sensor, a measured value representing an intensity of light received by the light sensor while the content is being displayed on the EPD panel, wherein the measured value corresponds to the first LTE value; determining, based on the measured value and the first LTE value, an ambient light level representing the ambient light intensity; and controlling a light-emitting diode (LED) of the device to emit light through the light guide panel onto the front surface of the EPD panel at a frontlight level associated with the ambient light level.

In certain embodiments, determining the first LTE value comprises determining that the content is of a text content type and accessing a lookup table stored in a memory of the device to determine that the first LTE value is associated with the text content type, wherein the lookup table includes data associating a content type with a corresponding LTE value.

In still other embodiments, the screen content comprises, for each display pixel of a plurality of display pixels of the EPD panel, a location of the display pixel and a brightness value representing a brightness of the display pixel. Determining the first LTE value comprises: determining, using a first brightness value of a first display pixel of the plurality of display pixels, a first reflectance value representing a second percentage of the ambient light intensity, the second percentage being reflected by the first display pixel and coupling into the light guide panel during display of the content on the EPD panel; receiving a map representing the front surface of the EPD panel, the map being divided into a plurality of zones arranged radially outward from a position of the light sensor with respect to the EPD panel, each zone of the plurality of zones being associated with a corresponding coefficient of a plurality of coefficients each representing decay of light that originates in the corresponding zone and is received by the light sensor; determining that a first location of the first display pixel is within a first zone of the plurality of zones, the first zone associated with a first coefficient of the plurality of coefficients; multiplying the first reflectance value by the first coefficient to produce a first intensity value; determining, using a second brightness value of a second display pixel of the plurality of display pixels, a second reflectance value representing a third percentage of the ambient light intensity, the third percentage being reflected by the second display pixel and coupling into the light guide panel during display of the content on the EPD panel; determining that a second location of the second display pixel is within a second zone of the plurality of zones, the second zone associated with a second coefficient of the plurality of coefficients; multiplying the second reflectance value by the second coefficient to produce a second intensity value; and calculating, as the first LTE value, a sum of the first intensity value and the second intensity value.

In other embodiments, the EPD panel comprises a first number of display pixels and the content data comprises, for each display pixel of the first number of display pixels, a location of the display pixel and a brightness value representing a brightness of the display pixel, and wherein determining the first LTE value comprises: for each display pixel of the first number of display pixels: determining, based on a corresponding brightness value of the display pixel during display of the content, a corresponding second percentage of the ambient light intensity, the second percentage being reflected by the display pixel and coupling into the light guide panel; determining that a corresponding location of the display pixel is associated with a corresponding coefficient of a plurality of coefficients, the corresponding coefficient representing decay of light that originates at the corresponding location and is received by the light sensor; and multiplying the corresponding second percentage by the corresponding coefficient to produce a corresponding intensity value for the display pixel; and adding the corresponding intensity values of all display pixels in the first number of display pixels to produce the first LTE value.

In certain embodiments, a device comprises: a display panel; a light sensor in optical communication with the display panel such that a portion of light reflected from the display panel is directed to the light sensor, the light sensor configured to detect light and generate a measured value representing an intensity of detected light; memory storing program instructions; and a processor in electronic communication with the display panel, the light sensor, and the memory. The processor executing the program instructions to: receive content data to be displayed on the display panel; determine, using the content data, a light transmission efficiency (LTE) value representing a first percentage of ambient light incident on the device, the first percentage being received by the light sensor when the content data is rendered on the display panel; display content, corresponding to the content data, on the display panel, wherein the EPD panel reflects a portion of the ambient light towards the light sensor; receive the measured value from the light sensor, the measured value being generated based on light detected by the light sensor during display of the content; determine, based on the measured value and the LTE value, an ambient light level of the ambient light; and perform an action associated with the ambient light level.

The device may further comprise an illuminator in electronic communication with the processor and positioned to illuminate the display panel, wherein to perform the action, the processor executes the program instructions to control the illuminator to illuminate the display panel at an illumination level that corresponds to the ambient light level. In certain approaches, a portion of light emitted by the illuminator is received by the light sensor, and the processor further executes the program instructions to: switch the illuminator on and off at a frequency to illuminate the display panel at the illumination level; and control the light sensor to detect light when the illuminator is off.

In some embodiments, the device further comprises a chassis retaining the display panel, the light sensor being disposed within the chassis such that the light sensor is occluded from directly receiving the ambient light, wherein the detected light is the portion of ambient light reflected from the display panel. The memory may further store a lookup table that associates a content type with an average LTE value, and to determine the LTE value, the processor further executes the program instructions to: determine that the content is of a first content type; and retrieve, from the lookup table as the LTE value, a first average LTE value associated with the first content type. In some approaches, the first content type is text, and a second content type in the lookup table is an identifier for an image.

In some approaches, the content data associates a first location on the display panel with a first brightness, and the content data associates a second location on the display panel with a second brightness, wherein to determine the LTE value the processor further executes the program instructions to: determine a first intensity value based on the first location and the first brightness, the first intensity value representing a second percentage of the ambient light, the second percentage being reflected from the first location to the light sensor when the content data is rendered on the display panel; determine a second intensity value based on the second location and the second brightness, the second intensity value representing a third percentage of the ambient light, the third percentage being reflected from the second location to the light sensor when the content data is rendered on the display panel; and calculate, as the LTE value, a sum of the first intensity value with the second intensity value. The device may further comprise a light guide panel optically coupled to the display panel, wherein a first incident portion of the ambient light is incident on the display panel at the first location, a first reflected portion of the first incident portion is reflected by the display panel and couples into the light guide panel, and a first received portion of the first reflected portion is received by the light sensor; the first reflected portion being proportional to the first brightness; the first received portion being determined by one or more structures of the light guide panel that determine a path of the first reflected portion; and the first received portion being the first percentage of the ambient light.

In some embodiments, the first brightness and the second brightness are within a brightness range extending from zero brightness, which produces a black color at a corresponding location on the display panel, to maximum brightness, which produces a white color at the corresponding location; wherein the brightness range is proportional to a reflectance range of the display panel, the reflectance range representing a reflectance percentage of incident light that is reflected by the display panel, the reflectance range extending from a minimum reflectance, which corresponds to zero brightness, to a maximum reflectance, which corresponds to maximum brightness; and wherein to determine the first intensity value, the processor executes the program instructions to: determine a first reflectance value from within the reflectance range, the first reflectance corresponding to the first brightness; determine a first distance of the first location from the light sensor; and multiply the first reflectance by a coefficient associated with the first distance to produce the first intensity value, the coefficient representing decay of light that originates at the corresponding location and is received by the light sensor.

The content data may comprise a plurality of pixels, each pixel of the plurality of pixels being associated with a corresponding display pixel of a plurality of display pixels of the display panel, and each pixel having a brightness value, wherein to determine the LTE value the processor further executes the program instructions to: determine, for each display pixel of the plurality of display pixels, a reflectance value representing a second percentage of the ambient light, the second percentage being reflected toward the light sensor by the display pixel when the display pixel is set to a brightness associated with the corresponding brightness value of the pixel that is associated with the display pixel; determine, for each display pixel of the plurality of display pixels, a distance of the display pixel from the light sensor; produce, for each display pixel of the plurality of display pixels, based on the corresponding reflectance value and the corresponding distance, a corresponding intensity value of a plurality of intensity values; and sum the plurality of intensity values to produce the LTE value.

In some embodiments, the memory may further store a map of the display panel, the map comprising a plurality of zones and a plurality of coefficients each associated with a corresponding zone of the plurality of zones and representing decay of light that originates in the corresponding zone and is received by the light sensor, the plurality of zones oriented with respect to a position on the map that corresponds to the light sensor, and wherein to determine the LTE value the processor executes the program instructions to: select a first point on the map, the first point being within a first zone of the plurality of zones and corresponding to a first location on the display panel; determine that the content data includes a first brightness value that sets the display panel to a first brightness at the first location when the display panel is displaying the screen content; determine a reflectance value representing a second percentage of the ambient light, the second percentage being reflected by a part of the display panel exhibiting the first brightness; determine that the first zone is associated with a first coefficient of the plurality of coefficients; and multiply the reflectance value by the first coefficient to produce the LTE value.

In accordance with other embodiments, a method is disclosed as comprising: receiving content data to be displayed on a display panel of a device; determining, using the content data, a first percentage of ambient light incident on the device, the first percentage being reflected by the display panel and conveyed to a light sensor of the device when the content data is rendered to the display panel; displaying content, corresponding to the content data, on the display panel; receiving a measured value from the light sensor, the measured value representing light detected by the light sensor during display of the content; determining, based on the first percentage and the measured value, an ambient light level of the ambient light, wherein the measured value corresponds to the first percentage of the ambient light; and performing an action associated with the ambient light level. Determining the first percentage may comprise: determining that the content data includes a first brightness value that sets a first display pixel of the display panel to a first brightness, and a second brightness value that sets a second display pixel of the display panel to a second brightness; determining, based on the first brightness value and a first location of the first display pixel in the display panel, a second percentage of the ambient light, the second percentage being reflected by the first display pixel and conveyed to the light sensor when the display panel displays the content; determining, based on the second brightness value and a second location of the second display pixel in the display panel, a third percentage of the ambient light, the third percentage being reflected by the second display pixel and conveyed to the light sensor when the display panel displays the content; and computing the first percentage based on the second percentage and the third percentage.

Determining the first percentage may further comprise: receiving a lookup table that associates a content type with a light transmission efficiency (LTE) value representing a predetermined percentage of model ambient light incident on the device, the predetermined percentage being reflected by the display panel and conveyed to the light sensor when the display panel displays model content of the content type; determining that the content is of the content type; and determining the first percentage as the predetermined percentage represented by the LTE value.

In some approaches, determining the first percentage comprises: determining whether the content is of a text content type; responsive to a determination that the content is of the text content type, determining the first percentage based on a light transmission efficiency value representing a predetermined percentage of model ambient light incident on the device, the predetermined percentage being reflected by the display panel and conveyed to the light sensor when the display panel displays model content of the text content type; and responsive to a determination that the content is not of the text content type: determining that rendering the content data to the display panel sets a first display pixel of the display panel to a first brightness, and sets a second display pixel of the display panel to a second brightness; determining, based on the first brightness and a first location of the first display pixel, a second percentage of the ambient light, the second percentage being reflected by the first display pixel and received by the light sensor when the display panel displays the content; determining, based on the second brightness and a second location of the second display pixel, a third percentage of the ambient light, the third percentage being reflected by the second display pixel and received by the light sensor when the display panel displays the content; and computing the first percentage based on the second percentage and the third percentage.

In other embodiments, determining the first percentage comprises: determining that the content data includes a plurality of brightness values that each represent a brightness of a display pixel of the display panel, each brightness value of the plurality of brightness values being associated with a corresponding display pixel of a plurality of display pixels of the display panel; determining, for each display pixel of the plurality of display pixels, and based on the corresponding brightness and a location within the display panel of the display pixel, a corresponding intensity value representing a second percentage of the ambient light, the second percentage being reflected by the display pixel and conveyed to the light sensor when the display panel displays the content; and computing a sum of the corresponding intensity values of all display pixels of the plurality of display pixels; and determining the first percentage based on the sum.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A method of compensating for performance variations of an illuminator of a reflective display device, the method comprising:
   emitting, with an illuminator, a pulse-width modulated (PWM) series of light pulses onto a front surface of a reflective display panel at a PWM frequency to generate a visible light having a first brightness level;
   generating, using a light sensor, a series of light intensity level samples at a sampling frequency asynchronous from the PWM frequency;
   determining, by a processor, a highest light intensity value of the series of light intensity level samples, the highest light intensity value corresponding to ambient light and emitted light from the illuminator during an entirety of a first sampling period;
   determining, by the processor, a lowest light intensity value of the series of light intensity level samples, the lowest light intensity value corresponding to the ambient light in the absence of the emitted light from the illuminator during an entirety of a second sampling period;
   determining, by the processor, a difference between the highest light intensity level and the lowest light intensity level, the difference corresponding to an emitted light intensity level attributed to individual light pulses from the illuminator;

comparing, by the processor, the emitted light intensity level to an expected emitted light intensity level to generate an intensity offset; and adjusting, by the processor, the first brightness level according to the intensity offset.

2. The method of claim 1, wherein adjusting the first brightness level of the visible light comprises changing a current value provided to the illuminator during the individual light pulses, changing a duty cycle of the PWM series of light pulses, or both.

3. The method of claim 1, further comprising generating the series of light intensity level samples during a page turn event.

4. A method, comprising:
emitting a series of light pulses with an illuminator, using a first current value, onto a display panel to generate a visible light having a first brightness level, the series of light pulses emitted such that individual periods of illumination by the illuminator are interleaved with individual periods during which the illuminator is turned off;
sampling, using a light sensor, ambient light and emitted light from the illuminator during a first sampling period to determine a first light intensity level, wherein the first sampling period occurs exclusively within an individual period of illumination;
sampling, using the light sensor, the ambient light during a second sampling period to determine a second light intensity level, wherein the second sampling period occurs exclusively within an individual period during which the illuminator is turned off; and
determining, by a processor, a difference between the first light intensity level and the second light intensity level, the difference corresponding to an emitted light intensity level attributed to the illuminator.

5. The method of claim 4, further comprising:
comparing, by the processor, the emitted light intensity level to an expected light intensity level; and
adjusting, by the processor, the first brightness level of the visible light according to the comparison.

6. The method of claim 5, wherein adjusting the first brightness level further comprises changing the first current value to a second current value, the method further comprising illuminating the illuminator with the second current value during subsequent periods of illumination.

7. The method of claim 5, further comprising outputting the series of light pulses in a pulse-width modulation (PWM) scheme, and wherein adjusting the first brightness level of the visible light further comprises changing a duty cycle of the light pulses.

8. The method of claim 4, further comprising:
determining, using the light sensor, a set of light intensity values over a time period;
determining, by the processor, a highest value of the set of light intensity values;
associating the highest value of the set of light intensity values with the first light intensity level;
determining, by the processor, a lowest value of the set of light intensity values; and
associating the lowest value of the set of light intensity values with the second light intensity level.

9. The method of claim 8, further comprising determining the set of light intensity values at a sampling frequency asynchronous from a frequency of the series of light pulses.

10. The method of claim 8, further comprising determining the set of light intensity values during a page turn event.

11. The method of claim 5, wherein comparing the emitted light intensity level to the expected light intensity level comprises:
determining, by the processor, an adjusted emitted light intensity level based on the emitted light intensity level and a light transmission efficiency (LTE), the LTE corresponding to a type of content displayed on the display device; and
comparing, by the processor, the adjusted emitted light intensity level to an expected light intensity level corresponding to the LTE.

12. A display device, comprising:
a display panel;
an illuminator configured to illuminate the display panel at a first brightness level via a series of light pulses comprising a plurality of individual periods of illumination where the illuminator is illuminated by a first current value, interleaved with individual periods during which the illuminator is off;
a light sensor configured to sense ambient light from a surrounding environment and emitted light from the illuminator; and
a processor communicatively coupled to the illuminator and the light sensor, the processor configured to:
sample, using the light sensor, the ambient light and the emitted light during a first sampling period to determine a first light intensity level, wherein the first sampling period occurs exclusively within an individual period of illumination;
sample, using the light sensor, the ambient light during a second sampling period to determine a second light intensity level, wherein the second sampling period occurs exclusively within an individual period during which the illuminator is off; and
determine a difference between the first light intensity level and the second light intensity level.

13. The display device of claim 12, wherein the difference between the first light intensity level and the second light intensity level corresponds to an emitted light intensity level attributed to the illuminator, wherein the processor is further configured to:
compare the emitted light intensity level to an expected light intensity level; and
adjust, according to the comparison, the first brightness level at which the illuminator illuminates the display panel.

14. The display device of claim 13, wherein the processor is further configured to adjust the first brightness level by changing the first current value to a second current value, and wherein the illuminator is further configured to be illuminated with the second current value during subsequent individual periods of illumination.

15. The display device of claim 13, wherein the illuminator is configured to illuminate the display panel via a pulse-width modulated (PWM) series of light pulses, and wherein the processor is further configured to adjust the first brightness level by changing a duty cycle of the light pulses.

16. The display device of claim 12, wherein the light sensor is configured to determine a series of light intensity values sampled over a time period; and
wherein the processor is further configured to:
determine a highest value of the series of light intensity values;
determine the first light intensity level by associating the highest value of the series of light intensity values with the first light intensity level;

determine a lowest value of the series of light intensity values; and determine the second light intensity level by associating the lowest value of the series of light intensity values with the second light intensity level.

17. The display device of claim 16, wherein the processor is further configured to vary a duty cycle of the series of light pulses during the time period.

18. The display device of claim 12, wherein the illuminator is further configured to emit the series of light pulses at a first frequency, and wherein the light sensor is further configured to generate the series of light intensity values at a second frequency asynchronous with the first frequency.

19. The display device of claim 12, further comprising:
a light guide configured to direct the ambient light and the emitted light to the light sensor; and
a chassis arranged over the light sensor and configured to isolate the light sensor from direct incident exposure to the ambient light.

20. The display device of claim 12, wherein the display panel comprises a reflective display panel and wherein the illuminator further comprises a front light configured to provide light onto a front side of the reflective display panel.

* * * * *